Jan. 24, 1967     L. R. McEACHERN     3,299,463
SYSTEMS FOR COLLECTING AND HANDLING LINT
Filed July 6, 1964     12 Sheets-Sheet 1
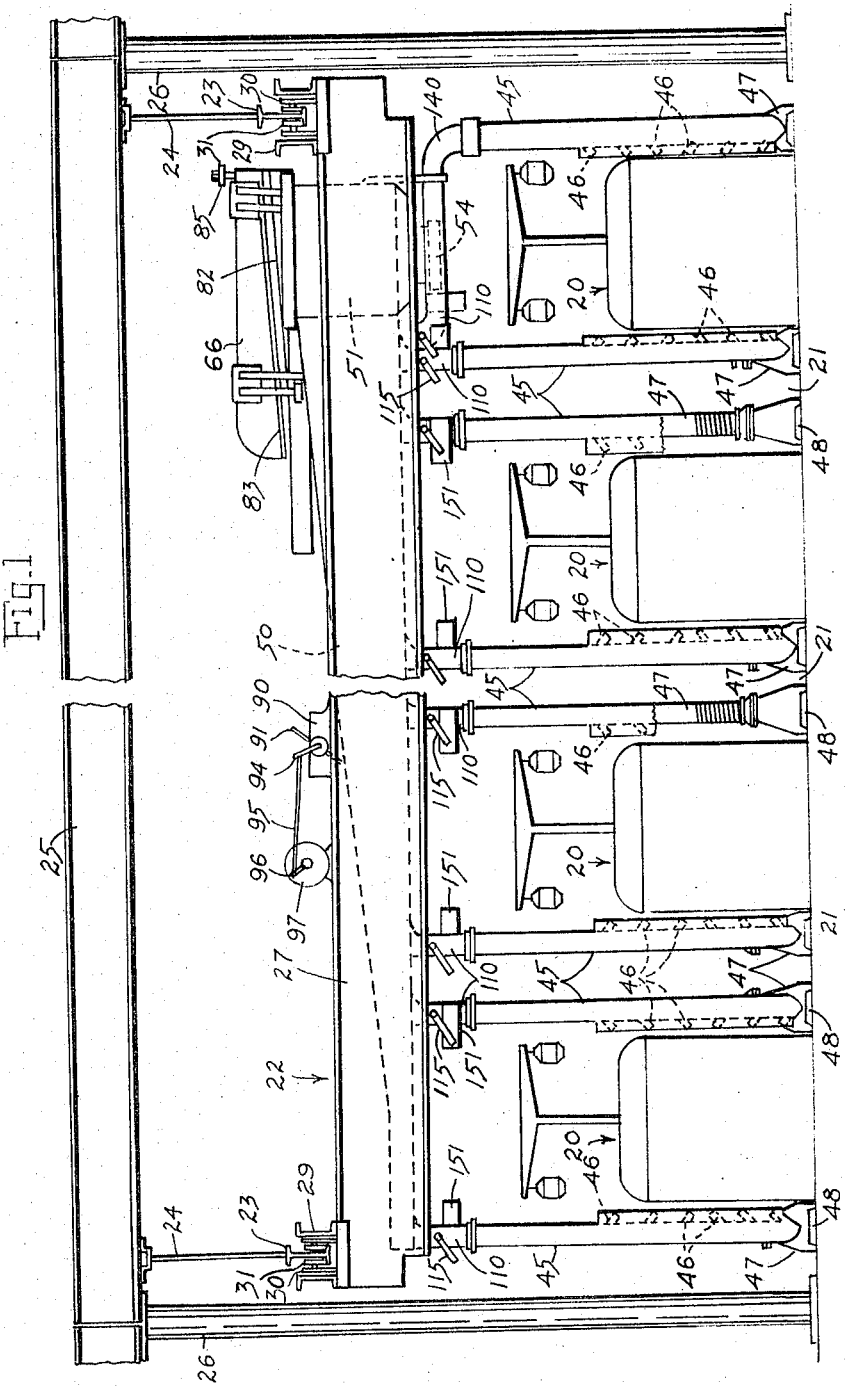
INVENTOR.
LOYD R. MCEACHERN
BY
WATTS & FISHER
ATTORNEYS

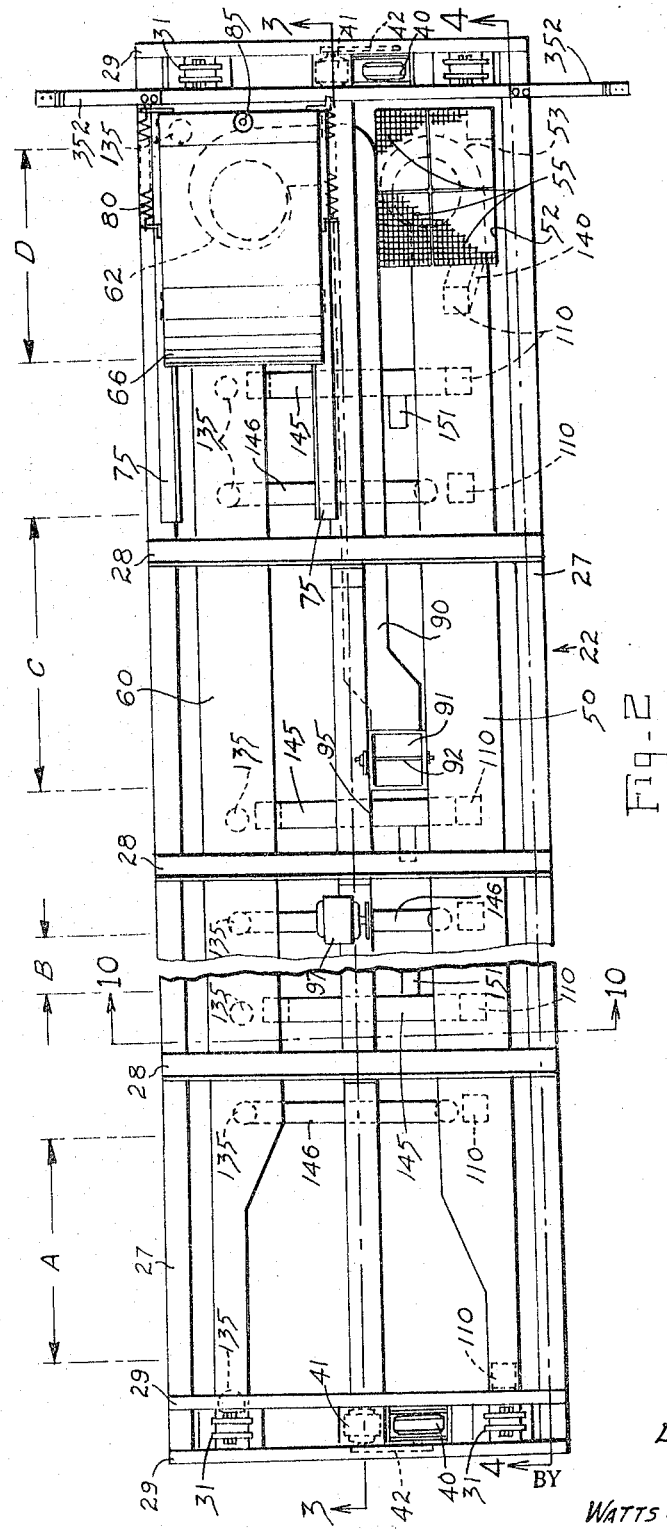

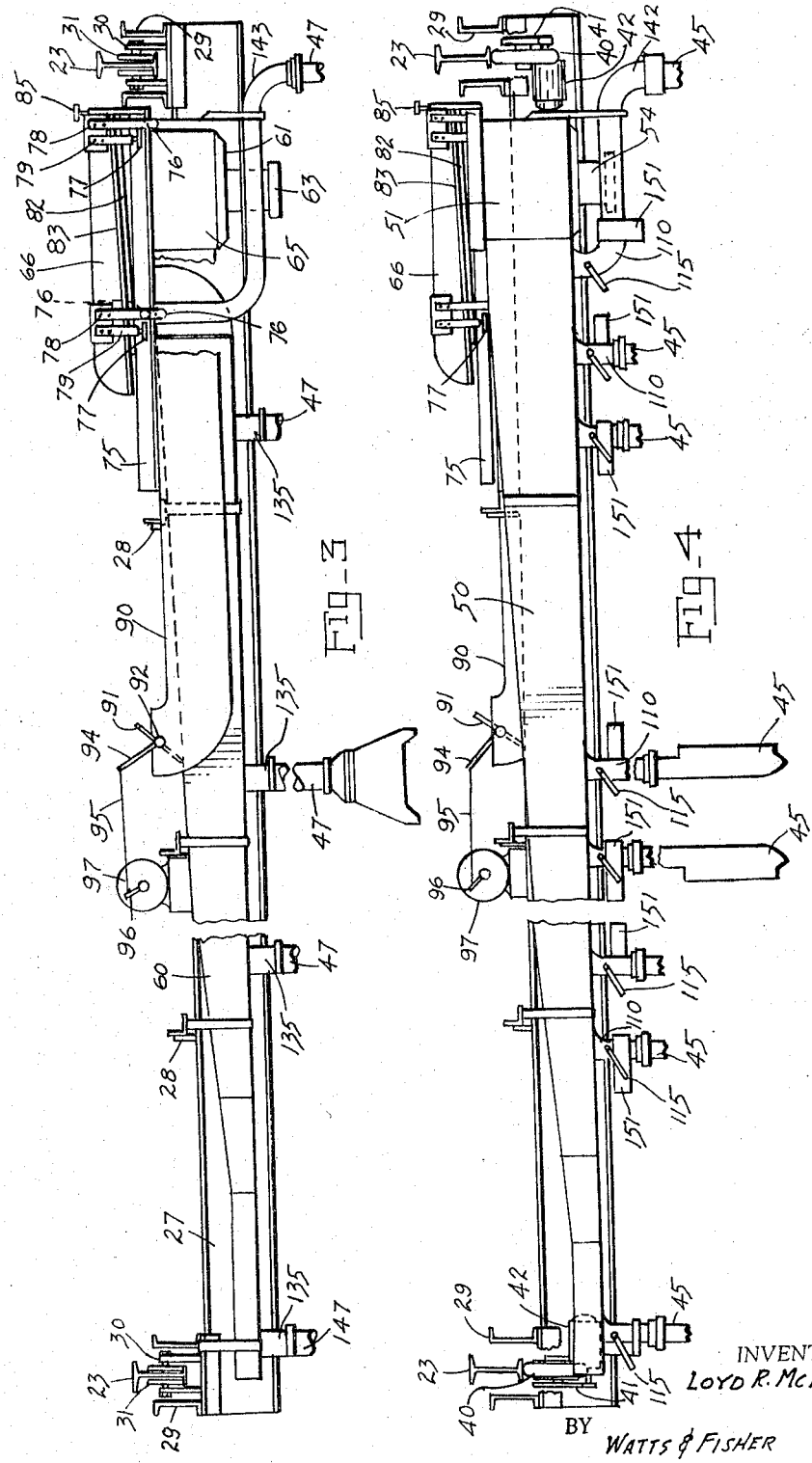

Jan. 24, 1967  L. R. McEACHERN  3,299,463
SYSTEMS FOR COLLECTING AND HANDLING LINT
Filed July 6, 1964  12 Sheets-Sheet 4
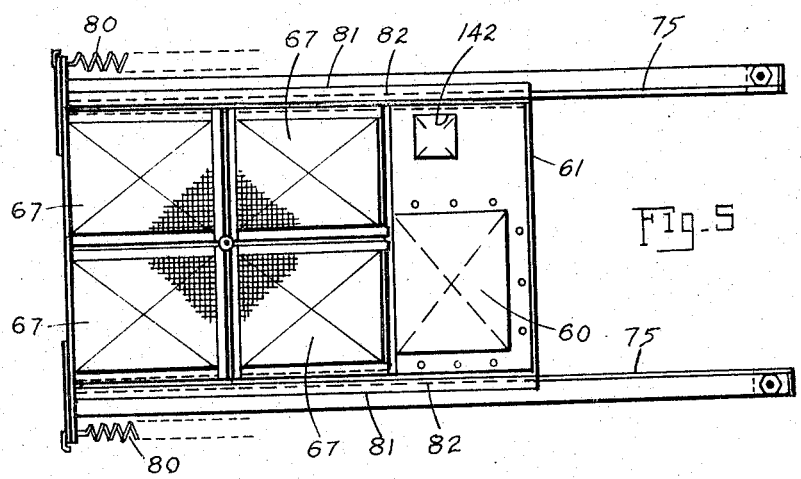
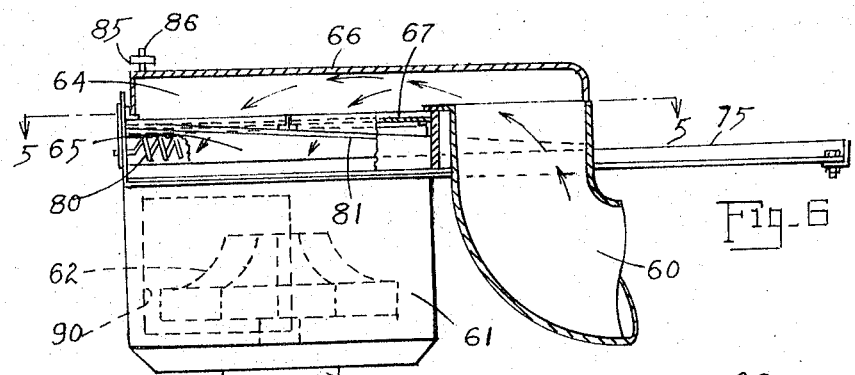
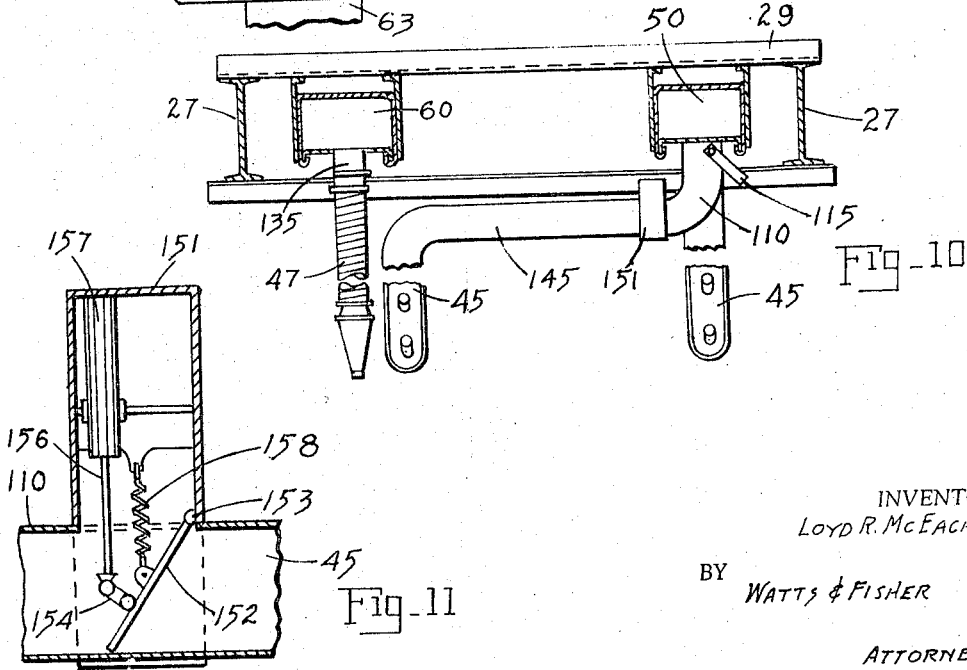
INVENTOR.
LOYD R. McEACHERN
BY WATTS & FISHER
ATTORNEYS Jan. 24, 1967  L. R. McEACHERN  3,299,463
SYSTEMS FOR COLLECTING AND HANDLING LINT
Filed July 6, 1964
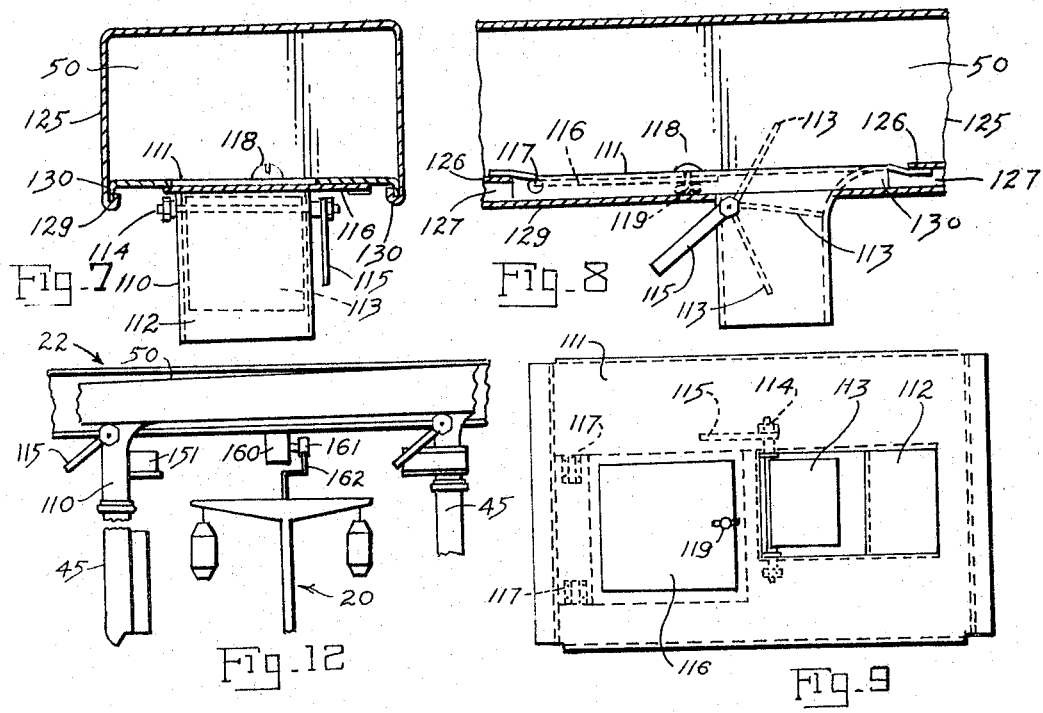
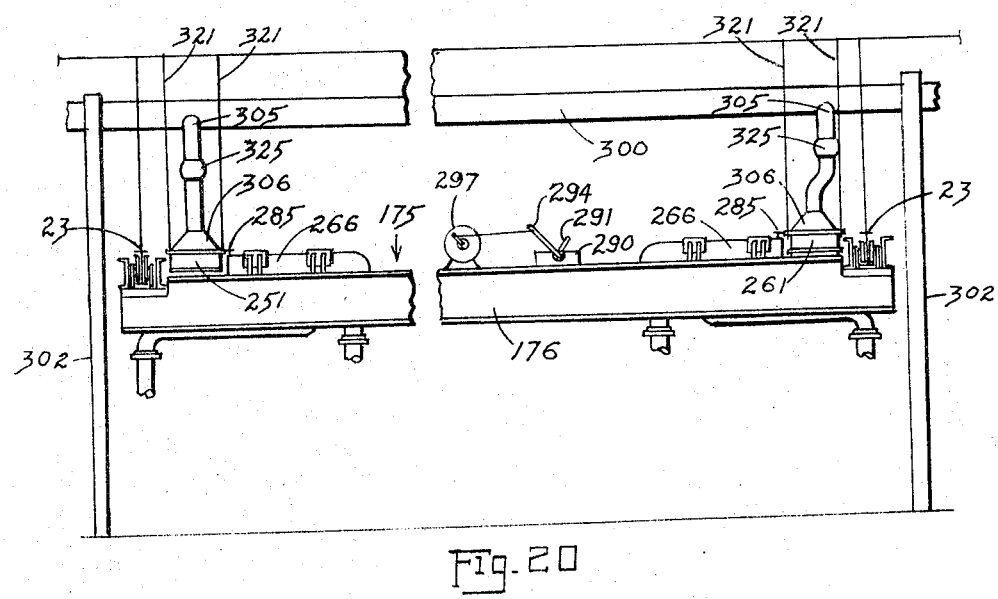
INVENTOR.
LOYD R. McEACHERN
BY WATTS & FISHER
ATTORNEYS

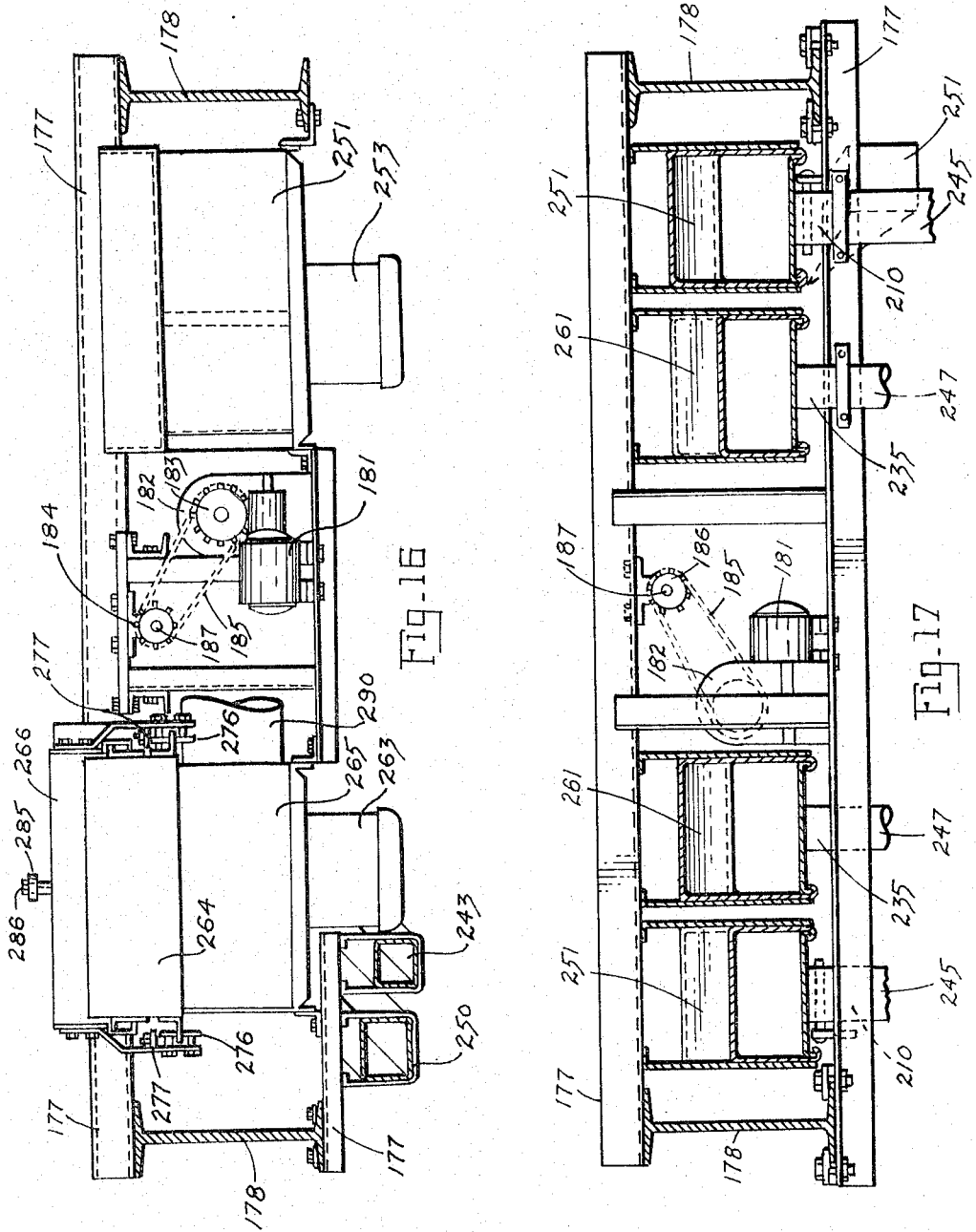

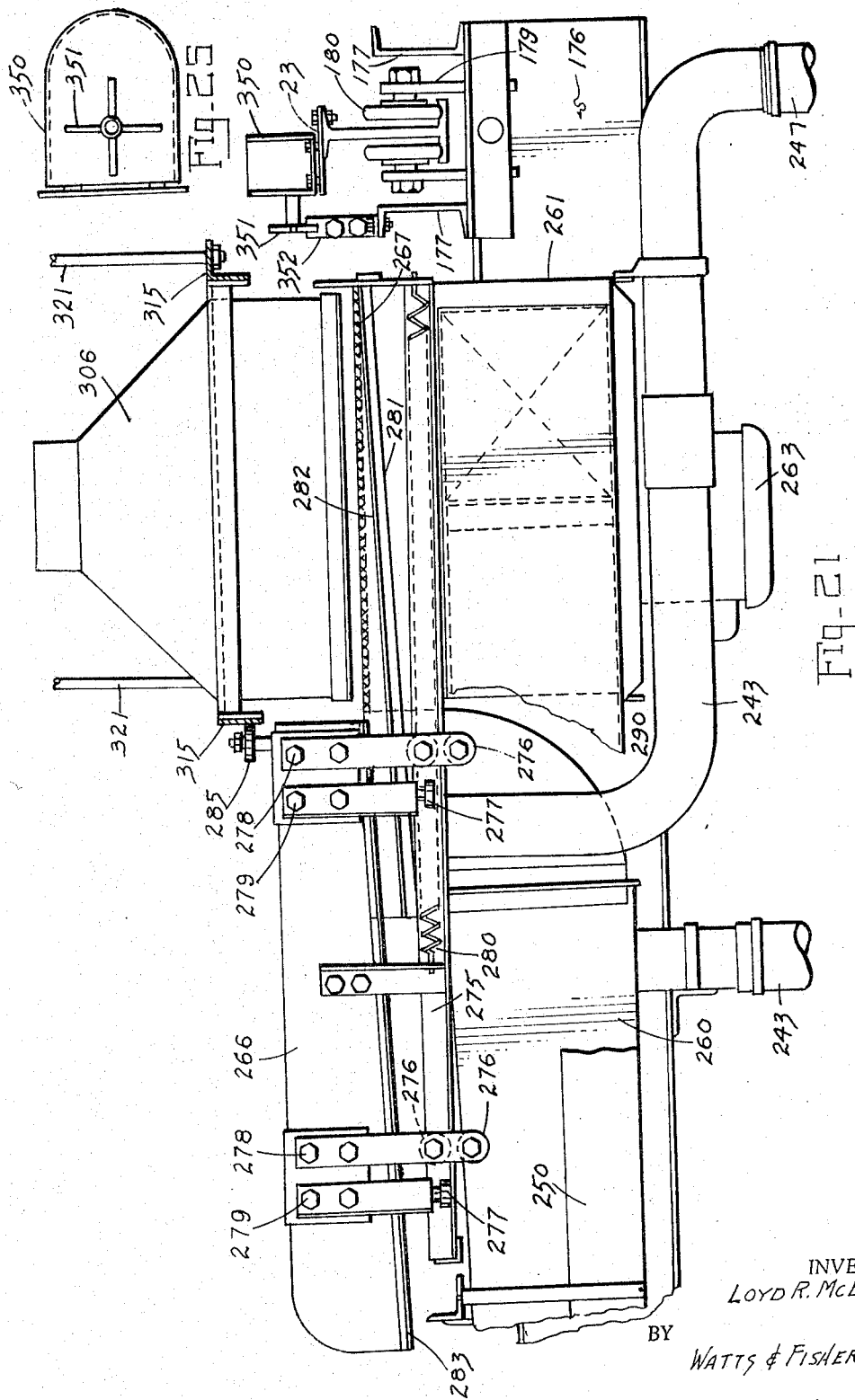

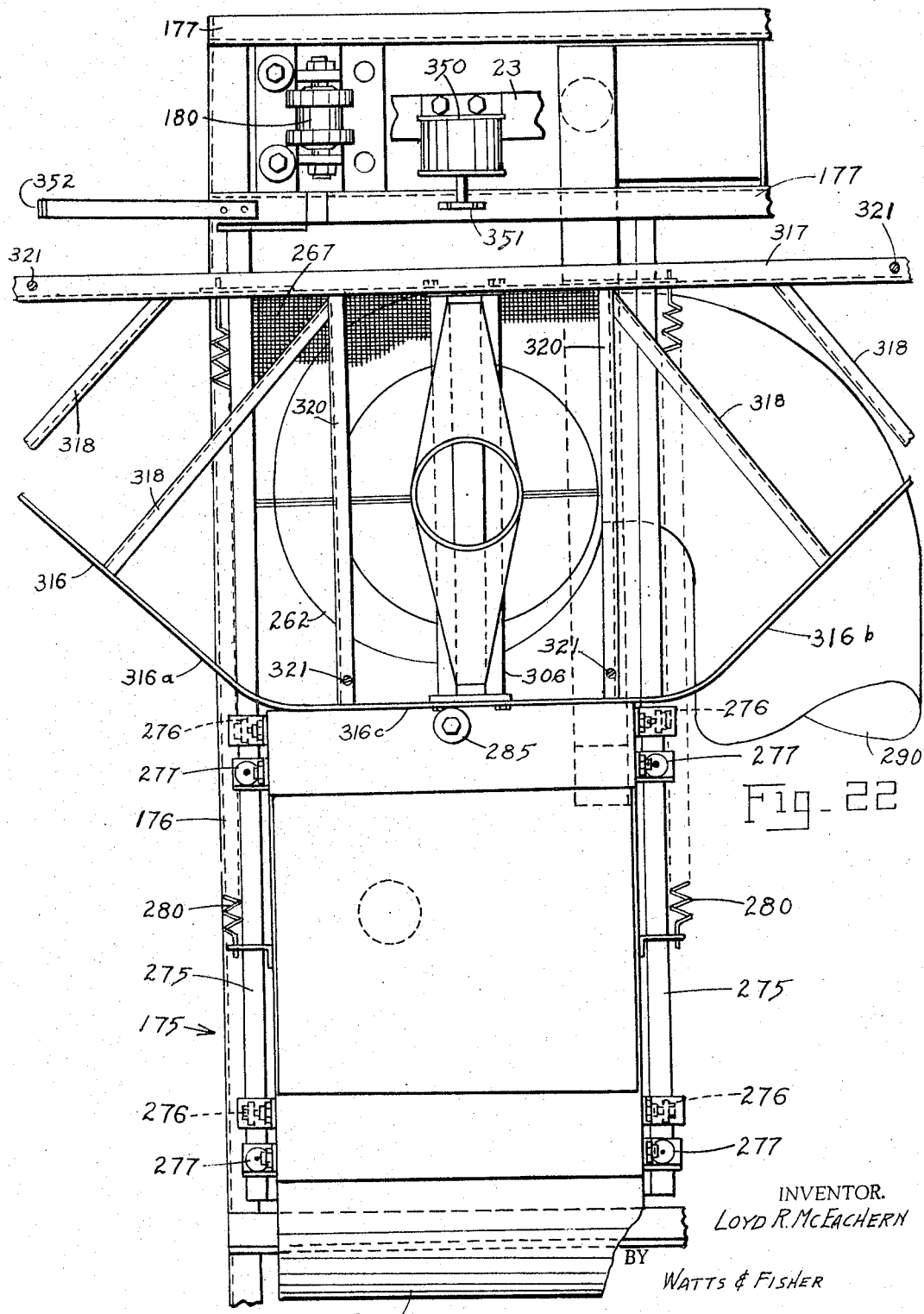

Jan. 24, 1967  L. R. McEACHERN  3,299,463
SYSTEMS FOR COLLECTING AND HANDLING LINT
Filed July 6, 1964  12 Sheets-Sheet 11
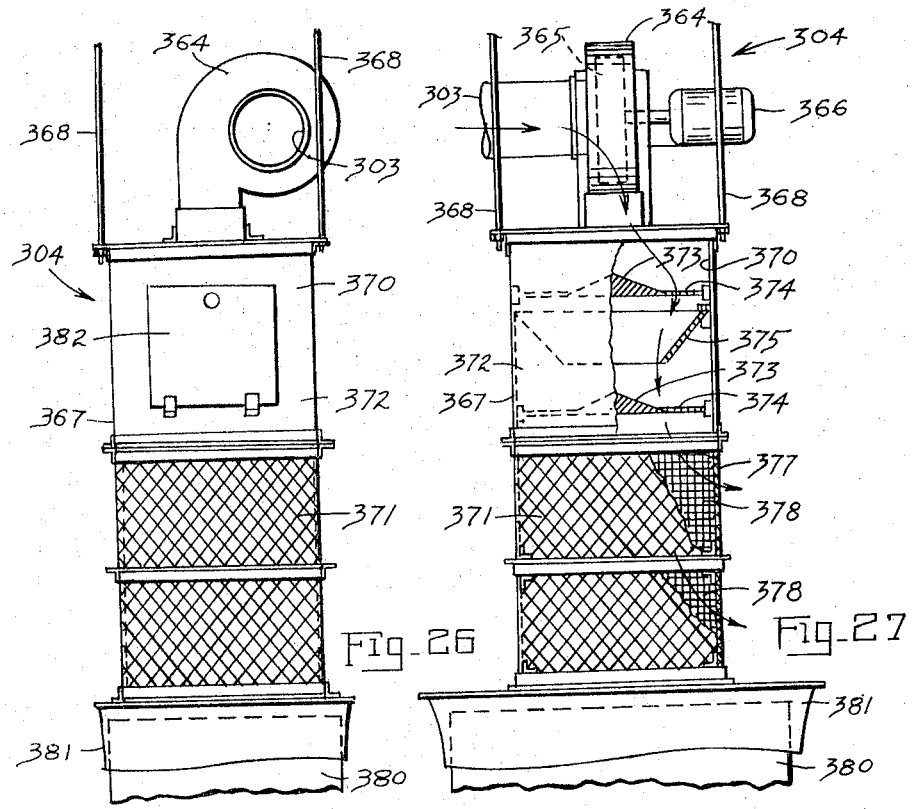
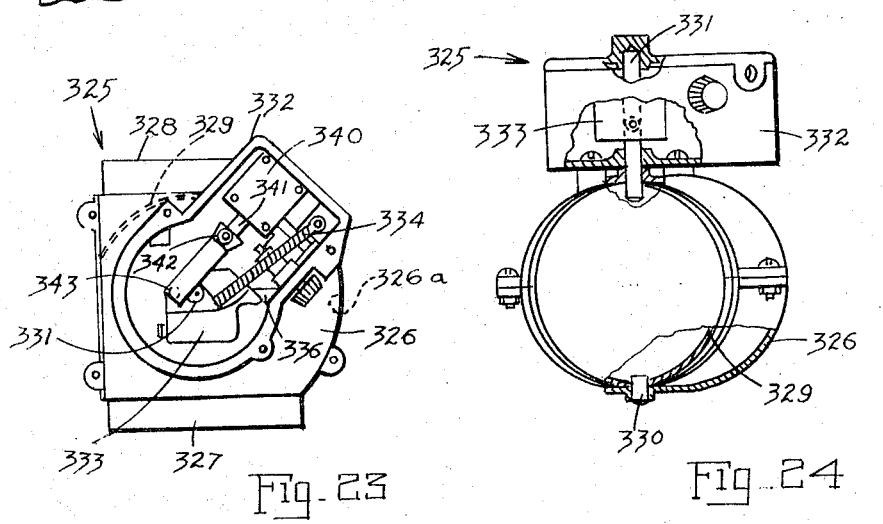
INVENTOR.
LOYD R. McEACHERN
BY WATTS & FISHER
ATTORNEYS

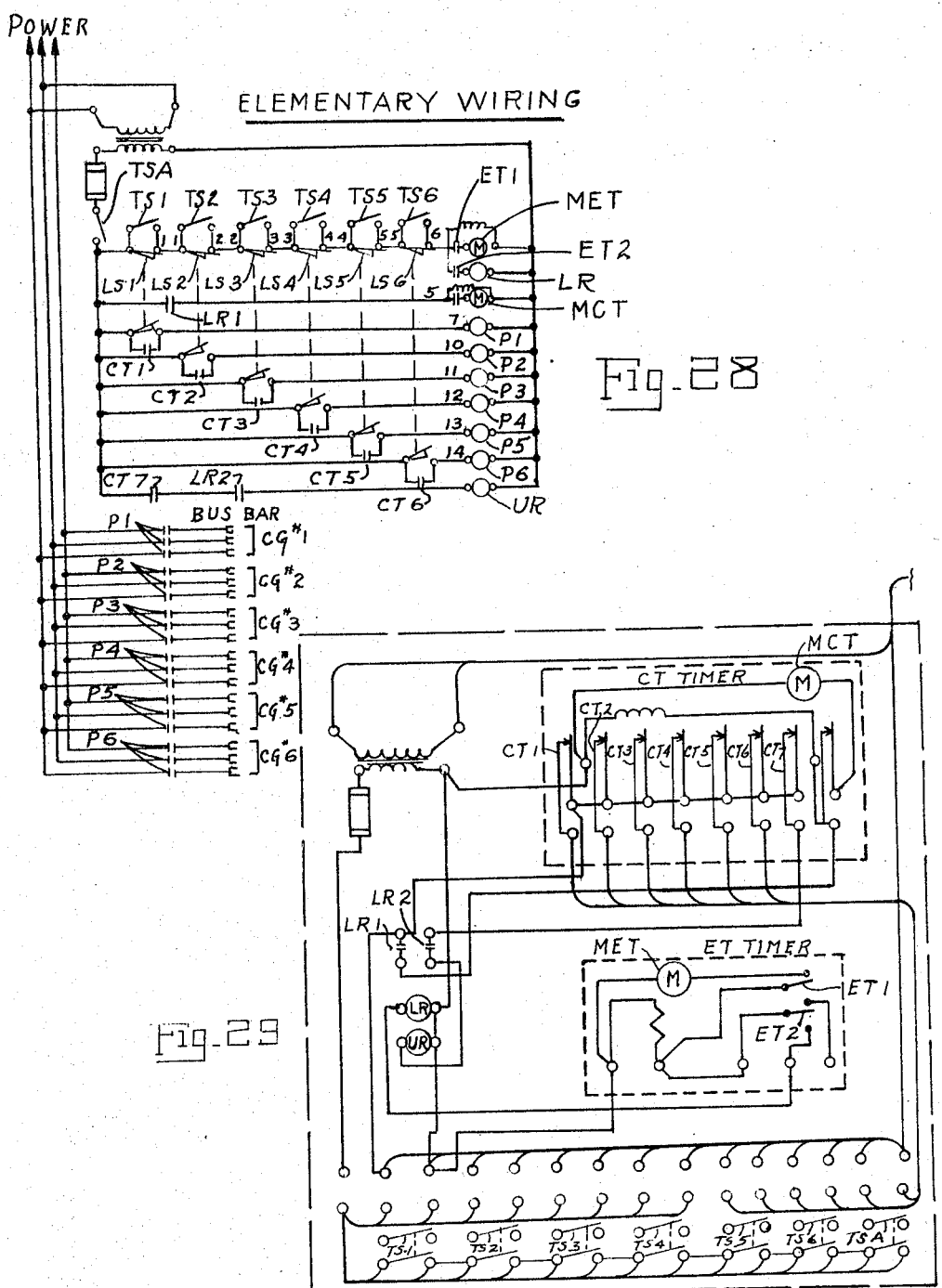

United States Patent Office 3,299,463
Patented Jan. 24, 1967

3,299,463
SYSTEMS FOR COLLECTING AND HANDLING
LINT
Loyd R. McEachern, Greenville, S.C., assignor to
The American Monorail Co.
Filed July 6, 1964, Ser. No. 380,217
16 Claims. (Cl. 15—312)

This application relates generally to the art of removing and collecting lint, and more specifically to new and improved apparatus for simultaneously removing lint from a plurality of textile machines and from the air above the machines, collecting the removed lint, and periodically transferring the collected lint to a place of disposal.

In the production of yarn, many short pieces of fiber are dislodged from the main body of fibers, such as from the sliver, roving or yarn, by the textile machines which are employed in the process and these short fibers, commonly known as "lint," are light and float around in the air until they collect on parts of the textile machines, parts of the building, including beams, the roof, and overhead structures of one sort and another and, to a considerable extent, on the floor.

Since accumulations of lint may become entangled in the yarn during its production, it has long been recognized necessary to remove such accumulations in order that the yarn produced may be free of lumps, slubs, knots and the like, which would appear in the woven fabric.

For many years numerous inventors and others in the art have attempted to solve the lint problem. Some of these attempts have principally involved the use of high velocity air streams that were directed against the textile machines and parts of the building to remove the lint accumulations. In some instances, means have been provided to collect lint which has been blown from the machines and settled from the air onto the floor. While these conventional procedures were effective to dislodge the lint and collect it after settling on the floor, the procedures had the distinct disadvantage that much of the lint dispersed into the air merely accumulated on other parts of the machines and buildings without being collected. Further, the lint floating in the air and the accumulations which dropped from the ceiling, track and other overhead structures become entangled in the yarn to form defects which appeared in the woven fabric.

Another major problem of the prior art relates to the installation of cleaning equipment to coincide with the installation of spinning frames. The conventional apparatus usually has been supported by the creels of the spinning frames. This conventional arrangement has required new track to be installed when installing new frames. Further, when it was desired to rearrange or replace spinning frames, the apparatus supported by each row of frames had to be dismantled.

Other problems encountered with prior apparatus include the maintenance required because of track wear, wear on the blower boots and suction tubes, and the wear occurring because the several moving parts of each cleaning apparatus. Further, it has also been difficult effectively to utilize floor space, since large cross alleys have normally been required for turning of the creel-mounted cleaning units between adjacent rows.

One effort to solve the foregoing lint problem is represented by U.S. Patents Nos. 3,003,178 and 3,086,891. The apparatus disclosed in these two patents included a suction device which travelled on a tri-rail track supported on the creels of a row of spinning machine. The suction device included a motor driven fan positioned in a housing from which tubes depended on opposite sides of the row of machines down close to the floor on which the spinning machines stood. Screens were positioned in that housing between the upper ends of the tubes and the fan chamber and movable doors in the housing permitted access to the lint collecting sides of those screens. A lint collecting system fixed in position along the course of travel of the apparatus had means for creating a flow of air by suction through a conduit having open ends which, when the doors were opened, were in such close proximity to the open ends of the conduits that the lint was removed therefrom by suction. The apparatus and methods of these two patents have been quite satisfactory for commercial use.

In certain instances, a blower device was coupled, in tractor-trailer form, to the above described suction device and was provided with a housing having a motor driven fan therein, tubes extending from the housing downwardly on opposite sides of a row of spinning machines with air outlets at various vertical levels, and with screens through which room air could be drawn into the housing by the fan and discharged down through the tubes against the machines. These screens were positioned in substantially the same planes as the screens on the suction unit and lint was removed from those screens by the same conduits which removed the lint from the screens in the suction unit. Thus, the just described suction and blower units represented what might be considered a tractor-trailer unit which removed lint from room air before that air was discharged under pressure against the spinning machines to remove lint therefrom and the lint which gravitated to the vicinity of the floor or collected on the floor was removed by the suction unit and caught on the screens of that device with the lint on both sets of screens being collected by a single collecting system. This tractor-trailer combination was also quite satisfactory in commercial operation, but did not entirely solve the lint collecting problem.

Another recent textile room cleaning apparatus which presents certain improvements over the prior art is disclosed in U.S. Patent No. 3,112,601. The apparatus disclosed in that patent includes a crane-type carriage which extends across a plurality of rows of the spinning frames and carries equipment for sucking up air and lint from near the floors of the aisles between adjacent rows and for blowing lint from machines in a plurality of rows. However, the apparatus does not include any means for removing lint from the air at a substantial height above the spinning frames, and for collecting removed lint and transferring it to a central place of disposal.

The present invention provides a solution to all phases of the lint problem by the simultaneous removal of lint from the textile machines in a plurality of rows, collection of the lint from near the floors of the aisles on opposite sides of a plurality of rows, and by the substantial reduction or elimination of the lint floating in the room air. The amount of lint floating in the air is materially reduced by the preferred use of lint-free air to dislodge accumulations from the machines and from the building and also by continuously removing the lint dispersed into the room air at a substantial height above the machines.

The invention also contemplates a pneumatic system for periodically and automatically collecting the lint removed from the room air and from the aisles between adjacent rows and transferring that lint to a central disposal station. This pneumatic collection of the lint may be accomplished while continuously removing lint from the several rows of machines and from the aisles between the rows.

In its preferred embodiment, the apparatus which forms one aspect of the invention comprises a plurality of cranes, each of which extends across a plurality of rows of machines and is movable lengthwise of the rows. At least one air inlet chamber and a suction chamber are supported on each crane, and a high pressure duct and a low pressure duct extend lengthwise of the crane from the air inlet chamber and the suction chamber, respectively. High pressure air blowing tubes extend downwardly from the high pressure duct on opposite sides of each row of machines and each of the high pressure tubes has at least one outlet for directing an air stream toward the adjacent machine to remove lint therefrom. Low pressure tubes are connected to the low pressure duct and extend downwardly on opposite sides of each row of machines for sucking up air and lint from near the floors of the aisles. A suitable filter screen is provided in the suction chamber in the path of the lint-carrying low pressure air stream flowing through the low pressure duct for removing lint therefrom.

Lint is removed from the room air above the machine by drawing room air through another filter screen. This latter screen is preferably provided in the air inlet chamber and is in the same plane as the low pressure air filter screen. In the preferred embodiment of the invention, the low pressure air stream is discharged from the suction chamber at a location remote from the air inlet chamber. This preferred arrangement circulates or stirs the room air above the crane to enhance removal of the lint from the room air.

The simplified construction of the apparatus provided by this invention will be apparent in that a single high pressure air fan, a single screen, and a single duct can be used to remove lint from the room air, create a high pressure, lint-free air stream and convey that air stream to each side of a plurality of rows of machines. Similarly, the single low pressure duct, a single filter screen in the suction chamber connected to the low pressure duct, and a single low pressure air fan can be used to suck up air and lint between each row of machines and remove the lint from the stream. Thus, the invention provides a new combination which accomplishes all of the fuctions of the prior art apparatus in addition to new functions, and yet eliminates many of the elements of the prior apparatus. Still other simplifications and improvements in the arrangement and construction of the apparatus provided by this invention will become apparent from the subsequent detailed description.

The preferred construction of the high and low pressure air ducts is such that, when it becomes necessary to change creels or to replace spinning frames, the overhead cleaning system is not affected such as has been the case with creel mounted equipment. Further, when installing new spinning frames, the cranes can be installed prior to the spinning frames and, as the frames are placed on the floor, the high and low pressure air tubes simply attached to the crane systems at the proper locations for the frames.

In accordance with the preferred pneumatic collection system provided by this invention, collection hoods are mounted adjacent the crane trackways above the paths of travel of the air inlet and suction chambers. The hoods are disposed so as to be closely adjacent the filter screens when the carriages are moved below the hoods. A single main collection station is provided and includes a suction fan connected to all of the hoods by suitable conduit structure. The collection station also includes apparatus for removing lint from the air flowing from the several hoods.

In operation, each of the hoods is selectively opened to the inflow air when a crane is moved adjacent the hood. As the filter screens travel below the open hood, the lint deposited on the screens is drawn off into the hood and is conveyed to the main collection station. There the lint is taken from the air and is placed in a suitable receptacle for removal.

Still other advantages and a fuller understanding of the invention will be had from the following detailed description when taken in conjunction with the accompanying drawings.

In the drawings:

FIGURE 1 is a schematic end elevational view of one embodiment of the invention installed in a spinning room;

FIGURE 2 is a top view of the apparatus illustrated in FIG. 1;

FIGURE 3 is a cross-sectional view taken on the line 3—3 of FIG. 2;

FIGURE 4 is a cross-sectional view taken on the line 4—4 of FIG. 2;

FIGURE 5 is a top plan view of a portion of the apparatus and is taken on the line 5—5 of FIG. 6;

FIGURE 6 is a side elevatioinal view, partially in cross-section of the portion of the apparatus shown in FIG. 5;

FIGURE 7 is a vertical cross-sectional view of another portion of the apparatus;

FIGURE 8 is a cross-sectional view of the portion of the apparatus shown in FIG. 7;

FIGURE 9 is a plan view of a portion of the apparatus shown in FIGS. 7 and 8;

FIGURE 10 is a foreshortened cross-sectional view with portions broken away taken on the line 10—10 of FIG. 2;

FIGURE 11 is a fragmentary, cross-sectional view of a portion of the apparatus;

FIGURE 12 is a foreshortened, fragmentary end elevational view of the apparatus;

FIGURE 16 is a cross-sectional view taken on the line 16—16 of FIG. 13;

FIGURE 17 is a cross-sectional view taken on the line 17—17 of FIG. 13;

FIGURE 20 is an end elevational view of the apparatus of FIGS. 13–17 is association with the pneumatic collection system;

FIGURE 21 is an enlarged, fragmentary elevational view of a portion of the apparatus in conjunction with the pneumatic collection system;

FIGURE 22 is a top plan view of the structure shown in FIG. 21;

FIGURE 23 is a side elevational view, with portions broken away, of a portion of the collection system;

FIGURE 24 is an end elevational view of the structure shown in FIG. 23;

FIGURE 25 is a side elevational view of a portion of the apparatus shown in FIG. 21;

FIGURE 26 is an elevational view of the main lint collection station;

FIGURE 27 is another elevational view of the structure shown in FIG. 26;

FIGURE 28 is an elementary wiring diagram of the preferred control system which forms another aspect of the invention; and FIGURE 29 is a schematic wiring diagram of the preferred control system.

Figure 13:
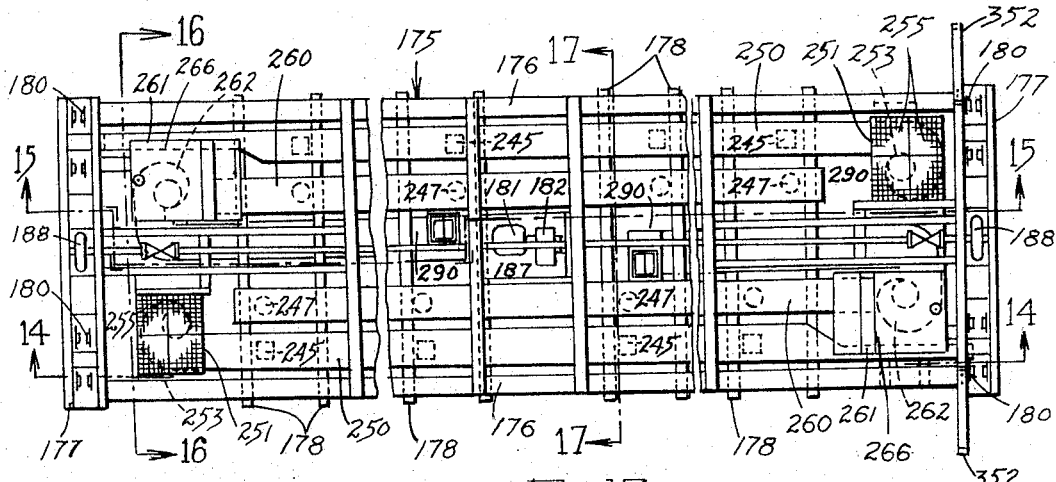
FIGURE 13 is a top plan view of another embodiment of the invention.
Figure 14:
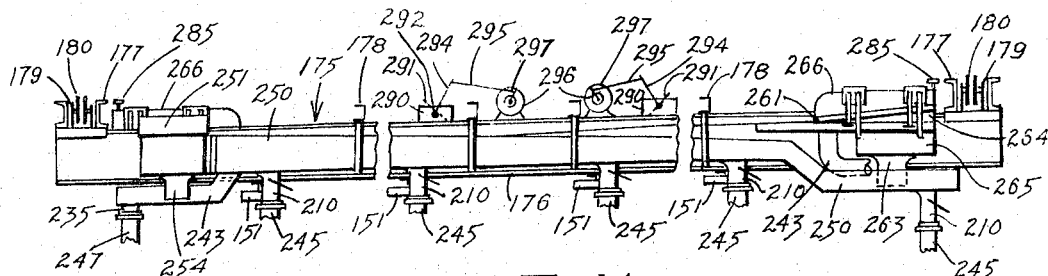
FIGURE 14 is a cross-sectional view taken on the line 14—14 of FIG. 13.
Figure 15:
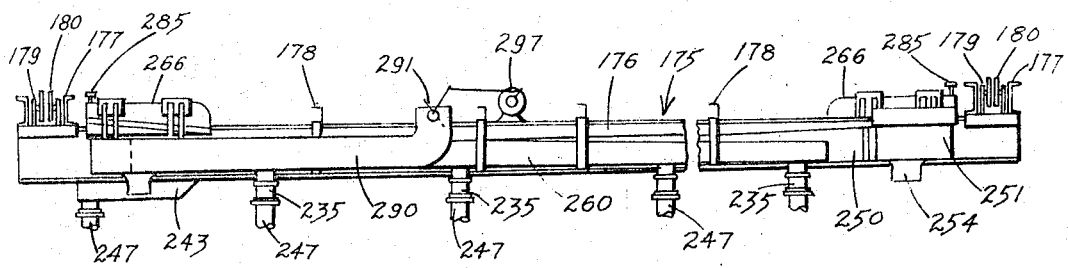
FIGURE 15 is a cross-sectional view taken on the line 15—15 of FIG. 13.

Referring now to the drawings, and to FIGS. 1 and 2 in particular, there is shown one embodiment of the present invention mounted to travel over a plurality of spinning machines. The spinning machines are generally designated by reference numeral 20 and are arranged in rows with aisle spaces 21 being provided between adjacent rows.

In accordance with the invention, an overhead carriage 22 extends across the several rows of spinning machines. The carriage 22 is mounted for travel on a trackway formed by rails 23. The rails 23 extend lengthwise of the rows and are supported by hangers 24 which depend from overhead beams 25 (only one of which is shown). In the illustrated arrangement, the beams 25 are supported by pillars 26.

The carriage 22 is a crane composed of side beams or bridges 27 which are connected by suitable cross bracing 28 and end frame members 29 so as to form a strong, rigid structure. Each end of the carriage 22 is provided with spaced wheel trucks 30 which are suspended by trolleys 31. The trolleys 31 include wheels running on the lower flanges of the trackway rails 23. Drive assemblies which include traction wheels 40 are also provided at the ends of the carriage 22. The wheels 40 are mounted by conventional structure (not shown) in springbiased driving engagement with the undersides of the rails 23. According to the illustrated construction, each of the traction wheels 40 is powered by a separate reversible motor 41. The motors 41 are carried on the ends of the carriage and are connected by chains 42 to sprockets (not shown) which are on the axles of the traction wheels 40, thereby to propel the carriage 22 from one end of the trackway to the other.

As is conventional, electrical energy for the motors 41 of the carriage 22 may be carried by bus bars (not shown) on the rails 23 or by wires (also not shown) supported from the pillars 26. Collectors, such as wheels or shoes (not shown) engaging the wires for bus bars may be used to collect current for conduction to a switch box on the carriage, whence conductors carry current to the motors 41. In operation, it will be understood that the carriage or crane 22 is moved from a home or starting position at one end of the trackway to the other end of the trackway where the carriage is stopped and its direction of movement is reversed to return it to the home position. Means for automatically stopping and reversing movement of each carriage 22 on the trackway is conventional in the art and is disclosed, for example, in U.S. Patent 2,812,251, issued November 5, 1957 to C. De V. Miller et al.

Various other cranes can be substituted for the specifically disclosed carriage 22 in accordance with the teachings of the present invention. It is to be understood, therefore, that the construction of the carriage 22 is not limiting of the invention and that the illustrated embodiment has been chosen only for purposes of clearly disclosing to those skilled in the art one complete and operative system.

The carriage 22 carries pneumatic lint removal and collection structure capable of creating high pressure, high velocity air streams and low pressure, low velocity air streams. The high pressure, high velocity air streams are discharged from tubes 45 which have vertically spaced air outlets 46 oriented to direct the high pressure air toward the sides of the spinning machines 20. The tubes 45 depend from the carriage 22 and, as shown, may be located on opposite sides of each row of spinning machines. Suitable tube constructions which can be used are more fully described in my U.S. Patent 2,946,521, issued July 26, 1960, and in U.S. Patent 2,974,342, issued March 14, 1961, to C. L. Fell.

Low pressure, low velocity air tubes 47 also extend downwardly from the carriage 22. In the preferred embodiments of the invention, a tube 47 is disposed adjacent each side of each row of spinning machines. The tubes 47 have air inlets 48 adjacent the floors of the aisles 21 so that lint in the area of influence of the suction which is created will be drawn into the tube inlets. The lint-carrying low pressure air streams flow upwardly through the tubes 47 and through filter screens suitable to remove the lint. Various low pressure air tube constructions suitable for use in sucking up the lint in the manner described are more fully set forth in my U.S. Patents No. 3,003,178, issued October 10, 1961, and No. 3,086,891, issued April 23, 1963.

Referring particularly to FIGS. 2 and 4, the structure for supplying high pressure blowing air to the several tubes 45 is shown in include a duct 50 which is mounted on the traveling carriage 22 to extend across the several rows of machines. The duct 50 is connected at one end to an air inlet chamber 51 which is supported at one end of the carriage. The chamber 51 has an inlet opening 52 for room air above the carriage, and a fan 53 is arranged in the chamber so that the high pressure side of the fan is in communication with the duct 50. The fan 53 is operated by a motor 54 which is electrically connected to the switch box (not shown) on the carriage 22.

One or more lint filtering screens 55 are mounted over the inlet opening 52 of the chamber 51. With this arrangement, operation of the fan 53 serves to draw room air from above the carriage 22 into the inlet chamber through the filter screens 55. The lint removed from the air drawn into the chamber is deposited on the outer or upstream surfaces of the screens 55. At the same time, a high pressure, lint-free air stream is created by the fan 53 and is directed into the upstream end of the duct 50 from whence the air stream is exhausted through the outlets of the tubes 45. The use of lint-free air streams to blow accumulations from the machines materially reduces the amount of lint which is dispersed into the room air.

A second duct 60 is also supported on the carriage 22 to extend across the several rows of spinning machines. The suction tubes 47 are connected by the duct 60 to a casing 61 (FIGS. 2 and 3). The casing 61 is mounted on the end of the carriage adjacent the chamber 51 and a suction fan 62 is disposed in the casing with its low pressure side in communication with the duct 60. The fan 62 is operated by a motor 63 which is electrically connected to the carriage switch box (not shown). Operation of the fan 62 causes low pressure air streams to flow upwardly through the tubes 47 and through the duct 60 into the casing 61.

As most clearly shown in FIGS. 5 and 6, the preferred construction of the casing 61 includes walls that define a collection chamber 64 and a suction chamber 65 in which the fan 62 is disposed. The duct 60 is connected to the collection chamber so that the lint-carrying air stream from the duct can flow upwardly into a movable cover 66 which forms part of the collection chamber. The cover 66 is normally disposed in a closed position over the suction chamber 65 and establishes a confined path of travel so that the air stream created by the fan 62 can flow downwardly into the suction chamber. Filter screens 67 are mounted between the suction chamber and the collection chamber in the path of travel of the air stream so that lint is removed from the air stream and is deposited on the upper or upstream surfaces of the screens. For reasons which will be made more apparent, the screens 67 are disposed in substantially the same plane as the screens 55 in the chamber 51.

The cover 66 is movable from its closed position to an open position in which the upstream surfaces of the screens 67 are exposed to permit periodic removal of the deposited lint in a manner hereinafter described in detail. The cover 66 is movable on rails 75 which are connected to opposite sides of the casing 61 and extend beyond the casing toward the opposite end of the carriage 22. Each of the rails 75 includes a vertical flange and a horizontal flange projecting away from the casing. Each side of the cover 66 is provided with two sets of rollers which engage the rails. Each set of these guide rollers includes vertically disposed rollers 76 (FIG. 3) which roll along the upper and lower surfaces of the horizontal rail flanges and a horizontally disposed roller 77 which rolls along a vertical rail flange. The rollers 76 are connected to the cover by members 78 and the rollers 77 are connected to the cover by members 79. Thus constructed, the rollers 75 support the cover 66 for horizontal travel on the rails 75 and the rollers 77 prevent horizontal displacement of the cover during movement. Springs 80 (FIGS. 5 and 6) are preferably connected to the cover 66 and to the casing 61 to draw the cover to its closed position. A cover actuating member comprising a roller 85 which is mounted on a vertical pin 86 that extends upwardly from the cover 66 is provided so that the cover can be actuated to its open position against the actions of the springs 80 in a manner described below.

The casing 61 is also provided along each side with a member 81 which has a laterally projecting flange 82. The members 81 are connected to upper side corners at one end of the casing so that the flanges 82 slope downwardly in the direction of opening movement of the cover 66. The flanges 82 form seats for correspondingly sloping side edge flanges 83 (FIGS. 1, 3 and 4) of the cover 66. Thus, when the cover 66 is in the closed position illustrated in FIG. 3, the side edge flanges 83 of the cover engage the flanges 82 so as to prevent air from being drawn into the casing 61 around the cover.

Air is blown from the casing 61 through a conduit 90 which is connected to an outlet opening or passage formed in the wall of the suction chamber 65. In the preferred construction, the conduit 90 extends from the casing 61 toward the center of the carriage 22 and the outlet end of the conduit 90 is above the carriage remote from the inlet chamber 51. As most clearly shown in FIGS. 1, 2 and 3, the outlet end of the conduit is provided with an air stream oscillating device comprising a plate 91. This plate is fixed on a shaft 92 which is rotatable in bushings secured to the sides of the conduit. The plate 91 is disposed with one end portion projecting into the outlet end of the conduit and the other end extending above the outlet. A crank 94 is fixed to one end of the shaft 92 and to this crank is pivotally connected one end of a link 95. The other end of the link 95 is pivotally connected to a relatively short crank 96 mounted on the drive shaft of a motor 97.

Actuation of the motor 97 serves to oscillate the shaft 92 so that the plate 91 is moved to and fro in the mouth of the conduit 90. This oscillation of the plate causes the air stream exhausted from the conduit to sweep back and forth across the ceiling of the room from one end of the carriage 22 to the other. The sweeping air stream advantageously stirs the air above the carriage so as to promote the flow of ambient air into the chamber 51 through the filter screens 55. In addition, the sweeping air stream is effective to remove and prevent lint accumulations on the ceiling of the room and other overhead structure.

As generally described above, a major problem in the installation of automatic cleaning equipment has been properly to locate the blowing and suction tubes relative to the spinning frames. This invention solves that problem by providing a construction wherein the lint removal and collection apparatus can be installed prior to the spinning frames and, as the frames are placed on the floor, the blowing tubes 45 and the suction tubes 47 simply connected to the ducts 50 and 60, respectively, at the proper locations for the frames.

In the preferred constructions, the tubes 45 are connected to the duct 50 through the blower drops 110. The construction of the blower drops 110 is most clearly shown in FIGS. 7, 8 and 9 as including a duct panel 111 and a tubular nozzle member 112 which has one end connected to the panel. An opening is cut through the panel 111 in communication with the nozzle member so that high pressure air streams in the duct 50 can enter the nozzle 112. A rotatable damper 113 is provided within each of the blower drops 110 for controlling the flow of high pressure air through the drops into the tubes 45.

As shown, the damper 113 is a plate having one edge connected to a rotatable shaft 114 which is journaled through the side walls of the nozzle member 112. An external operating handle 115 is fixed to one end of the damper shaft 114 and is rotatable to move the damper in the general positions shown by broken lines in FIG. 9. Maximum air flow through the blower drops is obtained when the dampers are in upwardly extending positions wherein their distal ends project into the duct 50. Reduced air flow results when the distal ends of the dampers 113 project downwardly in the blower drops so that the high pressure air in the duct 50 flows naturally into the drops without being diverted by the dampers. The air flow into the drops 110 can be selectively cut off by rotating the dampers to intermediate positions wherein the mouths of the nozzles 112 are closed.

Each of the blower drops 110 also includes an access door 116. The door 116 is hinged at 117 to the blower drop panel 111. The door 116 is releasably secured in its closed position by suitable means, such as by a threaded stud 118 which is welded to the panel 111 and extends through a slot in the door. A wing nut 119 or the like is engageable on the threaded stud 118 to hold the door closed. In use, the door 116 can be swung downwardly to provide access into the duct 50 through an opening 120 formed in the blower duct panel 111.

The preferred construction of the duct 50 includes a generally U-shaped member 125 which defines the side walls and top wall of the duct. The bottom wall of the duct is formed by elongated panel members 126 which have downwardly turned side flanges 127. Preferably, the cross-sectional shape of the duct defined by the members 125 and 126 progressively decreases in size from the inlet chamber 51 to the opposite closed end of the duct. This configuration assures uniformity in the volume and velocity of the high pressure air which is discharged from the blowing tubes 45.

The blower drops 110 can be conveniently installed at desired locations in the duct 50 by crimping the side edges 129 of the member 125 around the flanges 130 of the panels 111. After installation of the blower drops 110 in this manner, the duct 50 is completed by inserting the panel members 126 between the blower drops and crimping the side edges 129 inwardly and upwardly to grip the flanges 127 of the panels 126.

The construction of the suction duct 60 may be identical to the duct 50 described above. Further, the suction tubes 47 are connected to the suction duct through drops 135 which are similar to the drops 110 except that the dampers are eliminated. Thus, it will be apparent that with the preferred construction the carriage 22 and the ducts 50 and 60 can be installed prior to the spinning frames and the drops 110 and 135 later connected to the ducts properly to locate the blowing and suction tubes. Concomitantly, the locations of the blowing and suction tubes can be easily changed without dismantling the cleaning apparatus to suit altered arrangements of the spinning frames.

Referring again to FIG. 2, the several rows of spinning machines across which the carriage 22 extends are generally designated by reference characters A–D. In accordance with this invention a series of blower drops 110 are connected to the duct 50 so that blowing tubes 45 are provided on opposite sides of the rows. Since the duct 50 joins the inlet chamber 51 above the row D, a blower drop is located near the inlet chamber and is provided with a lateral extension 140 (FIGS. 1 and 4). The extension 140 projects to near the end of the carriage and carries a blowing tube at the right hand side of row D, as viewed in FIG. 2. The suction drops 135 are similarly connected to the duct 60 and are disposed in alignment with the drops 110. The suction drop for the tube 47 at the right hand side of row D may be directly connected to the casing 61 which is provided with a communicating opening 142 (FIG. 5) in the bottom wall of the collecting chamber 64. As shown in FIG. 3, the suction drop is connected to the right hand tube 47 by a suction drop extension 143.

In order to provide working space in the aisles 21 when the carriage is moved above the rows of spinning machines, the positions of the blowing and suction tubes at one side of each aisle are preferably staggered with respect to the aligned suction and blowing tubes on the other side of that aisle. To this end, the blower drops 110 above the left sides of rows B, C and D, as viewed in FIG. 2, are provided with extensions 145. These extensions 145 project across the carriage 22 so that the connected tubes 45 are close to the aligned suction tubes (FIG. 10). Similarly, extensions 146 are connected to the suction drops 135 above the right sides of rows A, B and C. The members 146 extend across the carriage so that the connected suction tubes 47 are close to the aligned blowing tubes. With this staggered arrangement, workers in the aisles 21 can avoid the blowing and suction tubes simply by stepping first to one side of the aisle and then the other as the carriage 22 passes overhead.

In some instances, it has been found desirable to provide means, in addition to the blower drop dampers 113, for automatically preventing air flow through selected blowing tubes 45, as when the carriage 22 is moved over a spinning frame that is not in use. To accomplish this, a conventional solenoid-actuated shut-off valve 151 may be mounted in a housing that is connected between each blowing tube and the blower drop for that tube. As illustrated in FIG. 11, each valve 151 comprises a shutter 152 which is disposed in the flow path from the connected blower drop 110 and is movable completely to stop the air flow or to allow full flow into the communicating tube 45. This shutter 152 is secured on a rotatable shaft 152. A link 154 is pivoted to the shutter and to the actuating plunger 156 of a solenoid 157. It will be seen that the shutter will be moved to its fully closed position by actuation of the solenoid. When the solenoid 157 is shut off, the shutter will be returned by a spring 158 to its fully open position.

As illustrated in FIG. 12, drum switches 160 (only one of which is shown) are mounted on the underside of the carriage 22 for actuating the solenoid-operated valves 151. Preferably, a four-position 360° rotation drum switch 160 is provided for each row of spinning machines and is electrically connected to the valves 151 which control the blower drops 110 at the sides of that row. The drum switches 160 have rotatable actuating elements 161 in the form of star wheels or the like so that the switches can be actuated in alternate off-on conditions by rotating the elements 161 in either direction.

A trip arm 162 (only one of which is shown) is mounted on both ends of each spinning frame. In operation, the trip arms at both ends of a frame are vertically disposed in positions to contact the drum switch actuating elements 161. Thus, when the carriage 22 approaches that frame, the first arm 162 will rotate the star wheel 161 of the switch 160 one position to actuate the connected solenoids 157 and thereby close the shutters 152. This prevents air flow from the high pressure blowing tubes 45 as the carriage passes over the spinning frame. When the carriage reaches the end of the frame, the second trip arm 162 will again rotate the star wheel one position to shut off the connected solenoids, thereby restoring the valves 151 to fully open conditions. The trip arms 162 can be removed from the operative position shown in FIG. 12 so that the valves 151 will be actuated only when desired during movement of the carriage.

Reference is now made to FIGS. 13–17 which illustrate another preferred embodiment of the carriage and associated cleaning apparatus provided by this invention. The carriage 175 of this embodiment is similar in construction to the previously described carriage 22 except that the carriage 175 is larger and is adapted to traverse more rows of spinning machines. As shown, the carriage 175 comprises parallel side beams or bridges 176 connected at their ends by beams 177 and between their ends by cross members 178. End trucks 179 are provided at the ends of the carriage and are suspended below rails (not shown) forming the carriage trackway by trolleys 180 which include wheels that run on the lower flanges of the trackway rails. A reversible motor 181 is mounted near the center of the carriage 175 and is connected through a gear reducer 182, sprockets 183 and 184, and a cooperating chain 185 to a drive shaft structure 187. The drive shaft structure 187 extends from one end of the carriage 175 to the other and carries traction wheels 188. The wheels 188 are engageable with the undersurface of the trackway rails to drive the carriage along the trackway between the ends of the several rows of spinning machines.

A high pressure air or blower duct 250 and a low pressure air or suction duct 260 are mounted on each side of the carriage 175, as distinguished from the previously described embodiment wherein a single blower duct and a single suction duct are povided. The two blower ducts 250 are constructed similarly to the duct 50 (FIGS. 9 and 10) and are connected to air inlet chambers 251 which correspond to the air inlet chamber 51. Thus, each of the chambers 251 has an inlet opening above the carriage, a fan 253 mounted in the chamber, a motor 254 for actuating the fan to draw ambient room air into the chamber and create a high pressure, high velocity air stream in the duct 250. Filter screens 255 are mounted over the inlet opening to remove lint from the room air drawn into the chamber 251. In the illustrated construction, the inlet air chambers 251 are located at opposite ends of the carriage 175.

The low pressure air or suction ducts 260 are connected to casings 261. The casings 261 also are disposed on opposite ends of the carriage 175 and each casing is adjacent a chamber 251. The casings 261 correspond to the casings 61 previously described in conjunction with FIGS. 3, 5 and 6, and each casing includes a collection chamber, a suction chamber, a fan 262 in the suction chamber, and a motor 263. A movable cover 266 is normally positioned over each suction chamber and filter screens are provided to remove the lint from the low pressure air streams flowing into the suction chambers from the ducts 260.

The low pressure suction air drawn into the casings 261 is exhausted through conduits 290 that are connected to the suction chambers of the casings. The conduits 290 extend toward the center of the carriage 175 and air stream oscillating devices, which include flow direction plates 291, are associated with the outlet ends of the conduits. As described in conjunction with FIGS. 1, 2 and 3, the plates 291 cause the air streams exhausted from the conduits to sweep back and forth across the ceiling, thereby removing lint accumulations from the ceiling and stirring the ambient air above the carriage.

Blower drops 210 and suction drops 235 are mounted in the ducts 250 and 260, respectively, at spaced locations along the length of the ducts. High pressure air blowing tubes 245 and low pressure air suction tubes 247 extend downwardly from the blower drops 210 and the suction drops 235, respectively, on opposite sides of each row of the machines traversed by the carriage 175. Referring particularly to FIG. 13, it will be seen that the high pressure air tubes 245 and the low pressure air tubes 247 are aligned laterally of the carriage and are arranged in pairs to provide a high pressure air tube and a low pressure tube on each side of each aisle. As in the arrangements described in connection with FIG. 2, the two pairs of tubes in each aisle are staggered with respect to each other so that workers in the aisles can avoid the tubes during movement of the carriage by stepping from one side of the aisle to the other.

The operation of the embodiment illustrated in FIGS. 13–17 is generally the same as the previously described embodiment. Thus, the reversible carriage motor is operated to drive the carriage 175 back and forth above the rows of spinning machines.

During this movement of the carriage 175, the high pressure air fans 253 are operated to draw ambient room air into the inlet chambers 251 and create high pressure air streams in the ducts 250. The room air drawn into the inlet chambers is filtered to remove lint and the lint-free high pressure air is exhausted from the tubes 245 against each side of each row of machines to remove lint accumulations. At the same time, the suction fans 262 are operated to draw lint and air into the inlet openings of the tubes 247 from near the floors of the aisles. The low pressure, lint-carrying air streams flow through the ducts 260 into the casing 261 where the air is filtered and then exhausted through the conduits 290 into the room above the carriage.

As generally discussed above, this invention also contemplates the provision of a lint collection system for periodically and automatically removing the lint deposited on the high and low pressure filter screens and transferring that lint to a main collection station. The arrangement and operation of the lint collection system is substantially the same with either of the previously described embodiments. Therefore, for purposes of simplicity, the system is hereinafter described in connection with the apparatus of FIGS. 13–17.

It will be understood that an actual installation for removing and collecting lint in a textile room will include a plurality of bays, each containing several rows of spinning machines. Preferably, each bay is provided with a trackway and a carriage which spans the several rows of spinning machines in the bay. The carriages are mounted end-to-end and moved in timed relation through the bays so that lint can be removed and collected concurrently from all of the rows of machines. Accordingly, the collection system is hereinafter described in relation to a plurality of carriages and it is to be understood that the components of the collection system can be added or removed so as to correspond to the number of carriages which are present in the installation.

Figure 18:
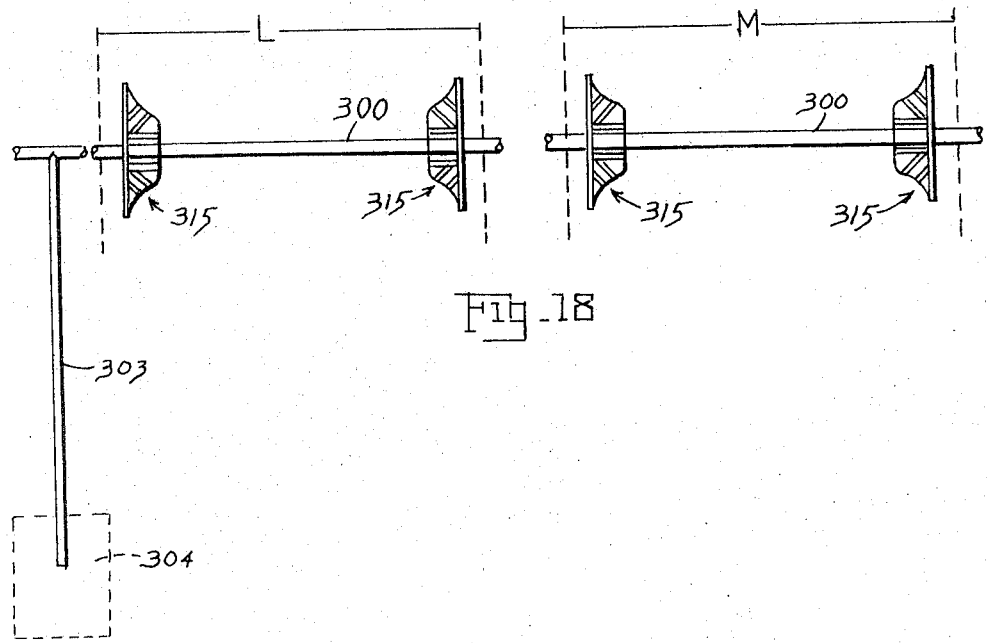
FIGURE 18 is a diagrammatical plan view of the preferred layout of the pneumatic collection system.

Referring now to FIG. 18, the broken lines designate two bays L and M of spinning machines. A main conduit 300 extends across the bays L and M above and between the ends of the trackways for the carriages (FIG. 20) and is supported by posts 302. The main conduit 300 is connected by a conduit 303 to a central collection station which is generally designated by reference numeral 304. As will be described in more detail, the central collection station 304 includes a source of low pressure suction air which causes a low pressure air stream to flow through the conduit 300 to the station.

A conduit 305 extends downwardly from the main conduit 300 at each side of each bay adjacent the trackway in that bay. The conduits 305 include collection hoods 306 having open lower ends. The lint removal or collection hoods 306 in each bay are disposed above the path of travel of the carriage 175 and in positions such that their lower open ends will be closely adjacent the inlet chambers 251 and the casings 261 at each end of the carriage when moved beneath the hoods. Thus, it will be seen that the chambers 251 and the casings 261 on all of the carriages are periodically moved beneath the collection hoods 306 as the several carriages travel between the ends of their runways.

Figure 19:
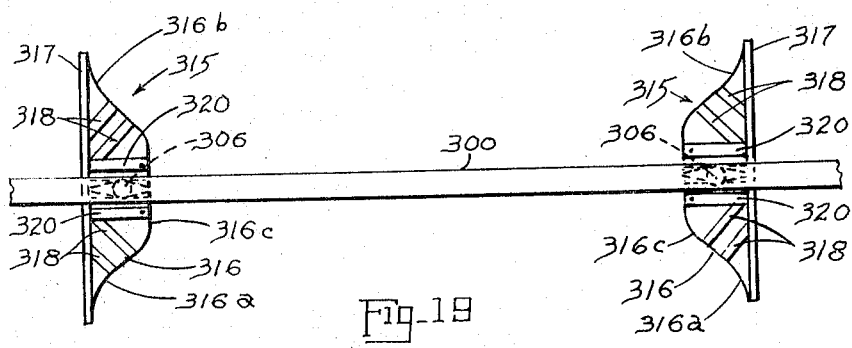
FIGURE 19 is a fragmentary plan view of a portion of the collection system.

When the carriages pass below the hoods 306, it is necessary to move the covers 266 from their normal positions over the suction chambers of the casings 261, thereby to expose the low pressure filter screens 267 to the upwardly flowing low pressure streams created through the open ends of the hoods. To this end, a cam 315 is mounted adjacent each of the collection hoods 306. As shown most clearly in FIGS. 19 and 22, each of the cams 315 is composed of a cam track 316 which may be formed by a rail or a metal strip having a flat side surface. The cam track 316 has sloping end portions 316a and 316b which project beyond the associated hood 306 in the direction of carriage movement and a connecting center or dwell portion 316c. The distal ends of the cam track 316 are connected by a rail or strip 317, and suitable braces 318 extend between intermediate portions of the track 316 and the strip 317. A center opening is defined in the cam 315 by parallel braces 320.

The cover actuating cams 315 are positioned with the lower ends of the hood 306 within the center openings and the ends of the hoods are suitably fastened to the track portion 316c and to the strips 317. The cams 315 are further supported by hangers 321 which depend from an overhead beam or the like (not shown) and are connected to the members 317 and 320. In this position, the track portions 316a and 316b are in the path of movement of the cover rollers 285 when the carriage 175 is moved past the hoods.

Referring particularly to FIGS. 21 and 22, it will be seen that, when the carriage 175 approaches the hoods 306, the cover rollers 285 at each end of the carriage will engage either the sloping track portions 316a or 316b depending upon the direction of carriage movement. Continued movement of the carriages below the hoods causes the rollers to roll along the sloping track portions so that the covers 266 are forced against the action of the springs 280 from their normally closed positions over the suction chambers to their open positions in which the low pressure air filter screens 267 are exposed. The center dwell portions 316c of the tracks 316 maintain the covers in their open positions as the suction chambers pass below the lower open end of the hoods. When the casing covers 266 have been opened in this manner, the source of low pressure air at the center collection station 304 creates low pressure air streams which flow upwardly through the screens 267 into the hoods 306, thereby automatically removing lint deposited on the upstream sides of the screens and conveying the lint through the conduits 300 and 303 to the center station. Thereafter, the springs 280 serve to return the covers 266 to their closed positions as the rollers 285 ride along the trailing end portions of the tracks 316.

Since the air inlet chambers 251 are adjacent the casings 261, the inlet chambers 251 also will pass below the hoods 306 in close adjacency to their open lower ends. Thus, the source of low pressure air at the station 304 also causes low pressure air streams to flow upwardly through the high pressure air filter screens 255 and remove lint deposited on their upstream surfaces.

In the preferred construction of the lint collection system, the conduits 305 are provided with normally closed valves 325 above the hoods 306, and these valves are opened only for short intervals when the carriages are moved below the hoods in the manner described above. A suitable valve construction for controlling the flow of air into the lower open ends of the hoods 306 is illustrated in FIGS. 23 and 24. As there shown, the valve 325 comprises a valve body 326 having an inlet end 327 and an outlet end 328. A damper 329 is rotatably mounted in the valve body 326 by pins 330 and 331. The damper 329 is rotatable from a closed position shown in broken lines in FIG. 23 to an open position in which the damper is nested adjacent the curved side wall 326a of the body 326, thereby establishing communication between the inlet and outlet ends of the valve.

The pin 331 is journaled in the side walls of a housing 332 which is attached to the valve body. An axially offset weight 333 is fixed to the pin 331 so that the weight tends to rotate the pin counterclockwise, as viewed in FIG. 23. A spring 334 is also connected to the weight and to a wall of the housing 332. The weight 333 and the housing 334 normally maintain the damper 329 in its closed position wherein a portion 335 of the weight is in engagement with a stop finger 336 connected to the hous- The damper 329 is actuated to its open position by a solenoid 340 which is also mounted in the housing 332. The actuating plunger 341 of the solenoid is suitably connected to a collar 342 on a member 343. The member 343 is in turn pivotally connected to the weight 333. When the solenoid 340 is actuated, the solenoid plunger 341 is retracted against the action of the weight 333 and the spring 334 to rotate the pin 331 and the damper 329 to its open position. When the solenoid is opened, the weight and the spring 334 cause the pin 331 to rotate in the opposite direction to return the damper to its closed position.

A four-position, 360° rotation drum switch 350 is provided adjacent one of the hoods 306 in each bay for actuating the valves 325 when the carriage 175 passes beneath the hoods. As shown, for example, in FIGS. 21 and 22 and 25, the drum switch 350 in each bay is mounted on the top of a rail 23 below the main conduit 300 of the collection system. The illustrated drum switch 350 has an actuating element in the form of a star wheel 351 and is electrically connected to the solenoids 340 of the valves 325 at each side of the bay of spinning machines. The carriage 175 is provided with a pair of trip arms 352 (FIG. 13) for contacting the arms of the star wheel 351 and thereby actuating the drum switch 350. In the construction shown, the trip arms 352 are mounted on the carriage end members 177 at each side of the carriage. Since the carriage 175 moves in both directions on the rails 23, the trip arms 352 extend from both sides of the carriage a sufficient distance to contact the star wheel 351 just prior to movement of the inlet chambers 251 and the casings 261 below the collection hoods 306. Thus, when the carriage 175 approaches the hoods 306 from either direction, the first trip arm on the carriage will contact the star wheel and rotate the drum switch to its first position which closes the solenoids 340 of both valves 325. As explained above, the valves 325 are opened when the solenoids are turned on so as to permit low pressure air streams to enter the lower ends of the hoods. When the carriage 175 passes from beneath the hoods, the trailing trip arm 352 on the carriage will contact the star wheel 351 and rotate the drum switch to a second position which turns the solenoid off. This closes both valves 325 to prevent further air flow into the hoods 306.

Reference is now made to FIGS. 26 and 27 which illustrate the preferred construction of the main collection station 304. As there shown, the outlet end of the conduit 303 is connected to a suction housing 364 in which is mounted a suction fan 365 that is operated by a motor 366. The suction housing 364 has an outlet in its lower side wall and is connected through the outlet into the upper end of a vertical filtering column 367. As shown, the filtering column 367 has an open lower end and is suspended above the floor by hangers 368.

In is preferred form, the filtering column 367 is of rectangular cross-section and includes an upper compartment 370 and a lower compartment 371. The upper compartment 370 is formed by imperforate wall panels 372. A pair of aligned, pyramidal baffles 373 are mounted within the compartment 370 by rods or other suitable braces 374. The baffles 373 are disposed in upright positions in the path of the air stream blown into the filtering column. Another baffle 375 in the form of an inverted, hollow truncated pyramid is disposed between the baffles 373 and is supported by braces 376. The baffles 373 and 375 serve to break up the lint-carrying air stream entering the filtering column and to reduce its velocity so that the lint will drop out of the air stream in the lower compartment 371.

The walls of the filtering column 367 which define the lower compartment 371 are perforate and may be formed by expanded metal sheets 377 or the like. The lower portion of the filtering column also includes lint filtering screens 378 which are mounted within the compartment 371 against the walls 377. The walls 377 prevent the screens 378 from bulging outwardly due to the pressure and velocity of the air blown into the column.

In operation of the collection system, the suction fan 365, serves as a common source of low pressure air for all of the hoods 306. When the valves 325 are selectively operated in the manner described above to open the conduits 305, the lint removed from the filter screens 255 and 267 is conveyed through the conduits to the top of the filtering column 367. The lint-carrying air stream flows downwardly through the upper compartment 370 of the column and is exhausted through the perforate walls 377 of the lower compartment 371. Since the velocity of the air stream is materially reduced by the baffles 373 and 375, the majority of the lint drops out of the air stream and falls from the open bottom end of the column into a suitable receptacle 380. If desired, a shroud 381 may be provided below the bottom opening of the compartment 371 to prevent any lint from being blown into the air. In addition, the column 367 may be provided with an access door 382 so that any lint which may cling to the inner walls of the column can be periodically removed.

As mentioned above, the construction and operation of the collection system is substantially the same with either embodiment 22 or 175 of the carriage apparatus. It will be understood in this regard that only one hood 306 and an associated cam 315 is provided in each bay of spinning machines when using the carriage 22 which carries a single inlet chamber 51 and a single casing 61.

The preferred embodiment of the collection system wherein the collection hoods 306 are selectively opened to the flow of low pressure only for short intervals affords several important advantages. As has been previously explained, a typical preferred installation will include a plurality of carriages, each running in a bay containing several rows of textile machines and at least one collection hood. Hence, it will be seen that, if all of the hoods were maintained in open communication with the conduit 300, a large fan and motor would be required at the main collection station 304 to establish sufficient flow of low pressure air necessary for removing lint from the screens on the carriages. Further, it is customary to air-condition the textile rooms and to maintain closely controlled humidity conditions. Hence, a collection system in which the hoods were open at all times would be objectionable, since a substantial quantity of the temperature and humidity controlled air would be drawn out of the room through the hoods.

The foregoing advantages are further enhanced by a preferred system of carriage operation in which the several carriages move along the trackways in staggered relationship instead of in a straight line. This staggered positioning of the carriages, which is maintained as each carriage travels from one end of its trackway to the other, reverses, and returns to the starting end, assures that only one carriage at a time will pass beneath a collection hood or hoods. Concomitantly, only the collection hood or hoods in a single bay will be open at any one time inasmuch as the valves 325 are opened and closed in response to carriage movement below the hoods. The preferred movement of the several carriages in spaced relationship also improves the lint removal and cleaning action of the apparatus.

Reference is now made to FIGS. 28 and 29 which show the preferred automatic carriage cycling system. The illustrated cycling system is for six carriages, although it will be understood that the system is equally adaptable to a greater or lesser number of carriages.

The carriage cycling system shown in FIGS. 28 and 29 includes double-acting limit switches LS1–LS6 for each of the six carriages CG1–CG6. The limit switches LS1–LS6 are fixed adjacent the trackway for the respective carriages CG1–CG6 so that each switch will be tripped and held by a carriage when the carriages are at the starting ends of the trackways adjacent corresponding ends of the rows of textile machines. As shown in FIG. 28, the normally closed sides of the limit switches LS1–LS6 are connected to the carriage motor contactors P1–P6, respectively.

A cycle delay timer ET is preferably provided to hold the carriages at the starting ends of the trackways for a predetermined time, as for example from two to 27½ minutes before each operating cycle. The delay timer motor MET is in series with the normally open sides of the limit switches LS1–LS6 and operates contacts ET1 and ET2. The normally closed contact ET1 is in series with the delay timer motor MET, while the normally open contact ET2 is connected across the motor in series with a latch relay coil LR. Energization of the latch relay coil LR is effective to close normally open contacts LR1 and LR2. The contact LR1 is in the motor circuit MCT of a cam timer CT. The cam timer CT is of conventional construction and includes contacts CT1–CT7 which are adapted to close successively at predetermined intervals, as for example, 15 second intervals. The contractors CT1–CT6 are in parallel with the normally closed sides of the limit switches LS1–LS6, respectively.

At the start of each operating cycle, all of the carriages are positioned at the starting ends of the trackways and the limit switches LS1–LS6 are held in the positions shown in FIG. 28. The cycle of operations is initiated by closing the off-on switch TSA to apply power to the circuit of the delay timer motor MET. When the MET motor circuit has been energized, the timer times out a predetermined delay period and then opens the ET1 contact and closes the ET2 contact. Opening of the contact ET1 breaks the coil circuit of MET and closing of the contact ET2 energizes the motor MCT of the cam timer CT through the latch relay contact LR1. When the cam timer CT has been energized, the contacts CT1–CT6 are successively closed at predetermined intervals. As each contact CT1–CT6 is closed, the contactors P1–P6 are energized thus applying power to the trackways for the carriages CG1–CG6. In this manner, the carriages are successively started at intervals determined by the cam timer setting.

When all of the carriages have been actuated from the starting ends of their trackway the contact CT7 of the timer is closed and the circuit of an unlatching relay coil UR is energized. This stops the cam timer and resets the actuators CT1–CT7. The contacts ET1 and ET2 are also closed and opened, respectively, for the next operating cycle.

The carriages travel to the opposite ends of the trackways, reverse, and immediately return to the starting ends. As each carriage CG1 through CG6 successively returns to the starting end of its trackway, the limit switches LS1–LS6 are tripped open to drop out the contactors P1–P6 and shut off the power to the stopping carriage. Since all of the normally open sides of the limit switches are in series, the carriages will be held at the starting ends of the trackways until the last carriage CG6 has returned. At this time, the circuit is again completed to the motor MET of the delay timer which again times out the present delay period to start another cycle of operations.

Since the carriages cannot be automatically actuated to start a repeating cycle until the last carriage in the previous cycle returns, toggle switches TS1–TS6 may be provided for selected use when it is desired to cycle less than all of the carriages, such as during repair of one of the carriages. Each of these toggle switches TS1–TS6 by-passes the automatic circuit for the carriages CG1–CG6, respectively, but does not turn off the power for the carriage trackway when the limit switches LS1–LS6 are tripped.

The operation of the apparatus of this invention will be understood by those skilled in the art from the foregoing description and may be summarized as follows:

In an installation utilizing a plurality of carriages, each of which is mounted on a separate trackway and extends over a plurality of rows of spinning frames, movement of the carriages is initiated at predetermined intervals from corresponding ends of the trackways. Thus, the several carriages move along the rows of spinning machines in staggered relationship rather than in a single line. Movement of the carriages is reversed when they reach the opposite ends of the trackways and the carriages are returned toward their starting positions. The previously described electrical system prevents the carriages from again moving from their starting positions on the trackway until all of the carriages are returned.

The high and low pressure air fans on the carriages are continuously operated during movement of the carriages along the rows to blow lint from the machines and to suck up air and lint from near the floors of the aisles. At the same time, room air is drawn into the inlet chambers through the high pressure filter screens and air is exhausted from the suction chambers at locations between the ends of the cranes or carriages. The air exhausted from the suction chambers serves to remove lint accumulation from the ceiling of the building and to stir the room air above the carriages. In this manner, the spinning machines, the floor, the air between the spinning machines and the ceiling, and the ceiling itself are kept free of lint.

During each traversal of the rows of spinning machines, each carriage is below one or more collection hoods depending upon how the suction and inlet chambers are situated on the carriages. When this occurs, the valves 325 are selectively opened to permit the inflow of air and removal of lint deposited on the filter screens. The lint thus removed into the hoods is conveyed to the main collection station where the lint is removed from the air.

Having thus described the present invention so that those skilled in the art may be able to understand and practice the same, I state that what I desire to secure by Letters Patent is defined in what is claimed.

What is claimed is:

1. Apparatus for removing lint from textile machines and the like and for collecting the lint, said apparatus comprising in combination:
    (a) a trackway;
    (b) carriage means mounted for travel on said trackway over said machines;
    (c) means supported by said carriage means including a high pressure tube having an outlet for directing a stream of air toward said machines to blow air therefrom and a low pressure tube having an inlet;
    (d) fan means supported on said carriage means;
    (e) said fan means having a high pressure side and a low pressure suction side;
    (f) structure which establishes a first flow path providing communication between said high pressure side and said high pressure tube and which establishes a second flow path providing communication between said low pressure suction side and said low pressure tube so that operation of said fan means is effective to blow air from said high pressure tube outlet and to cause a low pressure lint-carrying air stream to flow into and through said low pressure tube;
    (g) first screening means mounted in said first flow path upstream from said high pressure tube for removing lint from the air flowing to said high pressure tube;
    (h) second screening means mounted in said second flow part in the path of travel of said low pressure lint-carrying air stream;
    (i) said screening means being arranged in said flow paths in association with said structure so that operation of said fan means causes air streams to flow through both of said screening means in the same relative direction;

(j) and said first and second screening means having surfaces on which lint is deposited, during said operation of said fan means, said surfaces being located adjacent to each other and disposed in substantially the same plane so that lint can be removed from both surfaces at a single location adjacent the path of travel of said carriage means;

(k) and a pneumatic lint collecting system including a source of air and a member mounted along said trackway in position to be adjacent said surfaces of said screening means when said carriage means is moved past said member, said source of air being operable to create a flow of air through both of said screening means in a direction opposite to said relative direction in order to remove lint deposited on said surfaces.

2. Apparatus for removing lint from a plurality of spinning machines or the like arranged in rows with aisles between adjacent rows, collecting lint from near the floors of the aisles, and removing lint from the room air above the machines, said apparatus comprising:

(a) a trackway extending lengthwise of said rows above said machines, (b) carriage means mounted for travel on said trackway, said carriage means extending across a plurality of said rows of machines, (c) means supported by said carriage means including an inlet chamber, a duct extending lengthwise of said carriage means, tubes connected to said duct at spaced locations along its length, and a fan for drawing room air into said inlet chamber and discharging high pressure air streams through said tubes toward a plurality of rows of said machines, (d) screening means in said inlet chamber for filtering lint from the room air drawn into said inlet chamber, and (e) means supported by said carriage means including a fan, a casing, low pressure air screening means, a duct extending lengthwise of said carriage means and tubes connected to said duct at spaced locations along its length for drawing up air and lint from near the floors of the aisles between a plurality of rows of machines, filtering lint from the air, and discharging the air into the room.

(f) said casing including a cover movable to expose said low pressure air screening means, (g) said tubes being arranged in pairs along the length of said carriage means, the tubes in each pair being aligned laterally of said carriage means and consisting of a high pressure air tube and a low pressure air tube, said tubes being arranged to provide two pairs of tubes in each aisle between adjacent rows, the tubes in each pair being laterally off-set in the direction of travel of said carriage means from each tube in the other pair in the same aisle.

3. Apparatus for removing lint from a plurality of machines arranged in rows with aisles between adjacent rows, collecting lint from near the floors of the aisles, and removing lint from the room air above the machines, said apparatus comprising:

(a) a trackway extending lengthwise of said rows above said machine, (b) carriage means mounted for travel on said trackway, said carriage means extending across a plurality of said rows of machines, (c) means supported by said carriage means including an inlet chamber, a duct extending lengthwise of said carriage means, tubes connected to said duct at spaced locations along its length, and a fan for drawing room air into said chamber and discharging high pressure air streams through said tubes toward a plurality of rows of machines, (d) high pressure air screening means in said inlet chamber for filtering lint from the room air, (e) means supported by said carriage means including a fan, a casing, low pressure air screening means, a duct extending lengthwise of said carriage means and tubes connected to said duct at spaced locations along its length for drawing up air and lint from near the floors of the aisles between a plurality of rows of machines, filtering lint from the air, and discharging the air into the room, (f) said high and low pressure air screening means having surfaces on which lint is deposited, said surfaces being located adjacent to each other and disposed in substantially the same plane so that lint can be removed from both surfaces at a single location adjacent the path of travel of said carriage means, (g) said casing including a cover movable to expose said low pressure air screening means, (h) means for moving said cover to expose said low pressure air screening means, and (i) collecting means fixed along said trackway for pneumatically removing lint from both of said screening means.

4. The apparatus as claimed in claim 3 wherein said collecting means for removing lint from said screening means comprises a hood having a lower open end, said hood being disposed above the path of travel of said carriage means so that said lower open end is closely adjacent said screening means when said carriage means is moved beneath said hood, a main conduit connected to said hood, a fan having a suction side in communication with said main conduit to create a flow of air into the open lower end of said hood, and means in communication with the high pressure side of said latter-mentioned fan for removing lint from the low pressure air stream flowing through the said main conduit.

5. Apparatus as claimed in claim 4 wherein said means for removing lint from the air stream in said main conduit comprises a filtering column, said column having an upper compartment which receives the lint-carrying air stream from said main conduit, baffle means in said upper compartment for decreasing the velocity of the air stream entering said column so that lint falls out of the air stream, and a lower, open-ended compartment defined by permeable walls and including lint filtering screens adjacent the inner surfaces of said walls.

6. Apparatus for simultaneously removing lint from a plurality of spinning machines arranged in rows with aisles between adjacent rows, collecting lint from near the floors of the aisles along the sides of each row, and removing lint from the room air above the machines, said apparatus comprising:

(a) a trackway extending lengthwise of said rows of machines, (b) a carriage mounted for travel along said trackway, said carriage means extending across a plurality of said rows of machines, (c) first and second fans supported by said carriage, (d) motor means on said carriage connected to said fans, (e) a high pressure tube on opposite sides of a plurality of rows of machines, each of said high pressure tubes having an outlet for directing a high pressure air stream toward a row of machines to remove lint therefrom, (f) means connecting the high pressure side of said first fan to said high pressure tubes, (g) first screen means mounted upstream of said first fan to remove lint from the air flowing to said high pressure tubes, (h) a low pressure tube beside each of a plurality of rows of machines, each of said low pressure tubes having an inlet near the floors of the aisles, (i) means connecting the low pressure suction side of said second fan to said low pressure tubes so that a low pressure lint-carrying air stream is caused to flow through the low pressure connecting means from said low pressure tubes,
(j) second screening means in the path of travel of said low pressure lint-carrying air stream, said second screening means being located adjacent to and substantially in the same plane with said first screening means,
(k) means including a movable cover normally enclosing said second screening means,
(l) collecting means positioned adjacent said trackway for periodically removing lint deposited on said first and second screening means, and
(m) means mounted adjacent said collecting means for actuating said cover to expose said second screening means.

7. Apparatus for simultaneously removing lint from a plurality of spinning machines arranged in rows with aisles between adjacent rows, collecting lint from near the floors of the aisles, and removing lint from the room air above the machines, said apparatus comprising:
(a) a trackway extending lengthwise of said rows above said machines,
(b) a carriage mounted for reciprocation along said trackway,
(c) a high pressure duct on said carriage extending across said rows of machines,
(d) high pressure tubes extending downwardly from said high pressure duct on opposite sides of each row of machines, each of said high pressure tubes having at least one outlet for directing an air stream toward the adjacent machine to remove lint therefrom,
(e) an air inlet chamber supported on said carriage and connected to said high pressure duct, said chamber having an upper wall provided with an inlet opening for room air above said carriage,
(f) a fan in said inlet chamber arranged to draw room air into said inlet opening and direct a high pressure air stream into said high pressure duct and tubes,
(g) high pressure air screening means mounted over said inlet opening for removing lint from the room air drawn into said inlet chamber,
(h) a low pressure duct on said carriage extending across said rows of machines,
(i) low pressure tubes extending downwardly from said low pressure duct on opposite sides of each row of machines, each of said low pressure tubes having an inlet for air and lint near the floors of the aisles,
(j) a casing including a suction chamber supported on said carriage adjacent said inlet chamber and connected to said low pressure duct,
(k) a fan mounted in said suction chamber for causing low pressure air streams carrying lint to flow into and up through said low pressure tubes and through said low pressure duct into said suction chamber,
(l) low pressure air screening means mounted in said casing for removing lint from said low pressure air stream,
(m) said high pressure and low pressure air screening means having surfaces on which lint is deposited, said surfaces being located adjacent to each other and disposed in substantially the same plane so that lint can be removed from both surfaces at a single location adjacent the path of travel of said carriage along said trackway,
(n) an outlet conduit connected to said suction chamber, said outlet conduit having an outlet opening above said carriage and remote from said inlet opening for room air, and,
(o) motor means on said carriage for actuating each of said fans.

8. The apparatus as claimed in claim 7 including:
(p) a movable cover over said suction chamber, said cover being normally disposed over said surface of said low pressure air screening means,
(q) a collection hood fixed adjacent said trackway above said carriage, said hood having a lower open end which is close to said surface of said screening means when said carriage is moved beneath said hood,
(r) means adjacent said trackway for moving said cover to expose said low pressure air screening means when said carriage is moved beneath said hood, and,
(s) means to create a low pressure stream of air through said screening means and into and through said hood to remove lint from said surfaces of said screening means.

9. The apparatus as claimed in claim 7 including:
(t) a damper pivotally mounted in said outlet opening of said outlet conduit, and
(u) motor means mounted on said carriage for oscillating said damper to and fro.

10. The apparatus as claimed in claim 7 wherein each of said ducts comprises a generally U-shaped member defining top wall and side wall portions, a plurality of spaced elongated panel members clamped between said side walls to define spaced bottom wall portions, a plurality of duct panels mounted in spaced locations between said side wall portions and forming continuations of said spaced bottom wall portions, at least some of said duct panels including means providing access into said ducts, and a tubular nozzle extending from each of said duct panels, said nozzles being in communication with said ducts and connected to said tubes.

11. The apparatus as claimed in claim 10 including dampers rotatably mounted in at least some of said nozzles communicating with said high pressure duct, and means for actuating said nozzles to regulate the flow of high pressure air to said high pressure tubes.

12. Apparatus for simultaneously removing lint from a plurality of spinning machines arranged in rows with aisles between adjacent rows, collecting lint from near the floors of the aisles along the sides of each row, and removing lint from the room air above the machines, said apparatus comprising:
(a) a trackway extending lengthwise of said rows above said machines,
(b) a carriage mounted for reciprocation along said trackway,
(c) a pair of high pressure ducts on said carriage extending across a plurality of said rows of machines,
(d) high pressure tubes depending from said high pressure ducts adjacent a plurality of said rows of machines, each of said high pressure tubes having at least one outlet for directing an air stream toward the adjacent machine to remove lint therefrom,
(e) an inlet chamber supported on each end of said carriage, each of said inlet chambers being connected to a different one of said high pressure ducts and having an inlet opening for room air above said carriage,
(f) a fan in each of said inlet chambers, said fans being arranged to draw room air into said inlet openings of said chambers and to direct high pressure air streams into the communicating high pressure ducts and connected tubes,
(g) high pressure air screening means mounted in said inlet opening of each chamber for removing lint from the room air drawn into the said inlet chambers,
(h) a pair of low pressure ducts on said carriage extending across a plurality of said rows of machines,
(i) low pressure tubes extending downwardly from said low pressure ducts into a plurality of said aisles, each of said low pressure tubes having an inlet for air and lint near the floors of the aisles,
(j) a suction chamber supported on each end of said carriage,
(k) each of said suction chambers being connected to a different one of said low pressure ducts, (l) a fan mounted in each of said suction chambers for causing low pressure air streams carrying lint to flow into and up through said low pressure tubes and through said low pressure ducts into said suction chambers, (m) low pressure air screening means mounted in said suction chambers for removing lint from said low pressure air streams, (n) said suction chambers having outlet openings downstream from said low pressure air screening means and remote from said inlet openings of said inlet chambers, (o) a movable cover normally disposed over each of said suction chambers, and, (p) motor means on said carriage for actuating each of said fans.

13. The apparatus as claimed in claim 12 including:

(q) a collection hood affixed adjacent said trackway above each end of said carriage, said hoods having open lower ends which are closely adjacent said inlet and suction chambers when said carriage is moved beneath said hoods, (r) means for actuating said covers to expose said low pressure air screening means when said carriage is moved beneath said hoods, and, (s) means to create low pressure streams of air through said screening means and into and through the open lower ends of said hoods to remove lint from said screening means.

14. In an arrangement including carriage means movable over a row of textile machines, a pneumatic lint removal and collection system comprising:

(a) a chamber supported on said carriage means, (b) means establishing a flow path between said chamber and a location adjacent said row of machines, (c) a fan communicating with said chamber for creating a stream of air in said flow path, (d) screening means carried by said chamber, said screening means being disposed in said flow path to remove lint from said stream of air, (e) a collection hood mounted adjacent the path of travel of said carriage means, said hood having an open end which is close to said screening means when said carriage means is adjacent said hood, (f) means including a suction fan and a conduit connected between said hood and a main collection station, said suction fan being operable to create a low pressure air stream for removing lint from said screening means and transferring the lint to said main collection station, (g) means responsive to movement of said carriage means to establish air flow through said hood when said carriage means is adjacent said hood, and (h) a filtering column at said main station for separating lint from said low pressure air stream, (i) said filtering column including an upper chamber, baffle means in said upper chamber to decrease the velocity of said low pressure air stream, and a lower compartment having permeable walls and an open bottom end, (j) said baffle means including a plurality of members mounted in spaced alignment in the path of the air stream flowing through said upper compartment.

15. In an arrangement including a plurality of rows of textile machines, apparatus comprising:

(a) a plurality of parallel trackways extending lengthwise of said rows of machines, (b) a plurality of carriages movable along said trackways, each of said carriages extending across a plurality of rows, (c) an air inlet chamber and an adjacent suction chamber supported on each carriage, (d) means on each carriage for establishing a flow of high pressure air and a flow of low pressure air between said chamber and a plurality of rows of machines below the carriage, (e) lint screening means mounted in said chambers, said screening means on each carriage being located in a common path of travel and adjacent to one another in substantially the same plane so that lint can be collected at a single location adjacent the path of travel of each carriage, (f) means for moving said carriages in timed relation along said trackways so that said carriages are staggered with respect to each other, (g) a conduit extending above said trackways, (h) a collection hood connected to said conduit above the path of travel of each carriage, said hoods being closely adjacent said screening means when said carriages are below said hoods, (i) a suction fan connected to said conduit, (j) normally closed valve means between each hood and said conduit, (k) means on said carriages for selectively opening said valve means when each carriage is moved below a hood, and (l) motor means for operating said suction fan to create a flow of low pressure air into said hoods when said valve means are open so that lint is removed from the screening means.

16. Apparatus for cleaning textile machines arranged in rows with aisles between adjacent rows comprising in combination:

(a) a trackway including spaced apart rails extending parallel to the rows of machines, (b) a carriage movable on said trackway and extending across a plurality of said rows of machines, (c) an air inlet housing on said carriage, said housing including a wall provided with an inlet opening, (d) high pressure air screening means mounted in said inlet opening of said housing, (e) a high pressure air duct on said carriage connected to said housing and extending across a plurality of said rows of machines, (f) high pressure tubes connected to said high pressure duct in spaced locations along its length, said high pressure tubes extending downwardly from said high pressure duct adjacent the sides of a plurality of rows of machines, (g) a fan mounted in said housing for drawing air through said inlet opening and said high pressure air screening means and directing a high pressure air stream into said high pressure duct and connected tubes, each of said high pressure tubes having at least one outlet opening for directing an air stream toward the adjacent machine to remove lint therefrom, (h) damper means connected to said high pressure duct in the path of the high pressure air stream for selectively controlling the flow of air into said high pressure tubes, (i) a casing on said carriage adjacent said housing, said casing including a suction chamber and a collection chamber, (j) low pressure air screening means mounted between said chambers, (k) a low pressure duct connected to said collection chamber and extending lengthwise of said carriage parallel to said high pressure duct, (l) low pressure tubes connected to said low pressure duct at spaced locations along its length, said low pressure tubes extending downwardly into the aisles adjacent the sides of a plurality of rows of machines, said low pressure tubes having inlets for air and lint located near the floors of the aisles, (m) a suction fan mounted in said suction chamber for causing low pressure air streams carrying lint to flow into and up through said low pressure tubes and through said low pressure duct into said collection chamber and then through said low pressure air screening means into said suction chamber, (n) at least part of said collection chamber including a cover normally disposed over said low pressure air screening means, (o) means mounting said cover for reciprocal movement so that said cover can be actuated from its normal position to a remote position wherein said low pressure air screening means is exposed, (p) and structure fixed along said trackway including means for moving said cover to expose said low pressure air screening means and means for pneumatically removing lint from said low pressure air screening means.

References Cited by the Examiner

UNITED STATES PATENTS

| 1,698,180 | 1/1929 | White. | |
| 2,431,726 | 12/1947 | Bechtler. | |
| 2,812,251 | 11/1957 | Miller et al. | 15—312 |
| 3,001,222 | 9/1961 | Preston | 15—312.1 |
| 3,003,178 | 10/1961 | McEachern | 15—312.1 |
| 3,011,202 | 12/1961 | Holtzclaw | 15—312.1 |
| 3,011,205 | 12/1961 | Holtzclaw | 15—312.1 |
| 3,055,038 | 9/1962 | Black | 15—312.1 |
| 3,112,601 | 12/1963 | McCullough | 15—312.1 X |

ROBERT W. MICHELL, *Primary Examiner.*